United States Patent
Lee et al.

(10) Patent No.: US 11,456,463 B1
(45) Date of Patent: Sep. 27, 2022

(54) 3D-PRINTED ELECTRODE, GAS DIFFUSION ELECTRODE (GDE) AND GAS DIFFUSION LAYER (GDL) FOR FUEL CELL APPLICATIONS

(71) Applicant: TRIAD NATIONAL SECURITY, LLC, Los Alamos, NM (US)

(72) Inventors: Kwan-Soo Lee, Los Alamos, NM (US); Joseph Henry Dumont, Los Alamos, NM (US); Shaylynn LaSonja A. Crum, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 324 days.

(21) Appl. No.: 16/428,783

(22) Filed: May 31, 2019

Related U.S. Application Data

(60) Provisional application No. 62/678,822, filed on May 31, 2018.

(51) Int. Cl.
*H01M 4/92* (2006.01)
*C09D 11/102* (2014.01)
(Continued)

(52) U.S. Cl.
CPC .......... *H01M 4/923* (2013.01); *B29C 64/165* (2017.08); *B29C 64/188* (2017.08); *B33Y 10/00* (2014.12); *B33Y 70/00* (2014.12); *B33Y 80/00* (2014.12); *C09D 11/037* (2013.01); *C09D 11/102* (2013.01); *H01M 4/8626* (2013.01); *H01M 4/8668* (2013.01); *H01M 4/8828* (2013.01); *H01M 4/8885* (2013.01); *H01M 4/9041* (2013.01); *B29K 2075/00* (2013.01);
(Continued)

(58) Field of Classification Search
None
See application file for complete search history.

(56) References Cited

U.S. PATENT DOCUMENTS

| 9,534,097 B2 | 1/2017 | Hibbs |
| 10,053,535 B2 | 8/2018 | Kim et al. |
(Continued)

OTHER PUBLICATIONS

Artyushkova, K. et al., "Chemistry of Multitudinous Active Sites for Oxygen Reduction Reaction in Transition Metal-Nitrogen-Carbon Electrocatalysts," The Journal of Physical Chemistry C 119, 25917-25928, 2015.
(Continued)

*Primary Examiner* — Wyatt P McConnell
(74) *Attorney, Agent, or Firm* — Lewis Roca Rothgerber Christie LLP

(57) ABSTRACT

An electrocatalytically active ink composition is used with an additive manufacturing process, such as 3D printing, to produce electrodes having consistent, adaptable, and high surface area structures. The electrocatalytically active ink composition includes a mixed powdered precursor and a polymer matrix. The mixed powdered precursor includes a carbon source, a dopant source, and/or a metal-containing catalyst. The material and electrochemical properties of the ink composition may facilitate 3D printing of electrochemically active electrodes for energy conversion and storage devices, and may allow fine-tuning of macro- and microstructures to develop electrodes having improved activity and efficiency.

20 Claims, 12 Drawing Sheets

(51) Int. Cl.
H01M 4/90 (2006.01)
H01M 4/88 (2006.01)
H01M 4/86 (2006.01)
B33Y 10/00 (2015.01)
B33Y 80/00 (2015.01)
B33Y 70/00 (2020.01)
B29C 64/165 (2017.01)
B29C 64/188 (2017.01)
C09D 11/037 (2014.01)
B29L 31/34 (2006.01)
B29K 75/00 (2006.01)

(52) U.S. Cl.
CPC .............. B29K 2995/0005 (2013.01); B29L 2031/3468 (2013.01)

(56) References Cited

U.S. PATENT DOCUMENTS

| | | | | |
|---|---|---|---|---|
| 2013/0189577 | A1* | 7/2013 | Wang | H01G 11/28 429/211 |
| 2014/0220474 | A1* | 8/2014 | Okada | H01M 4/8668 429/484 |
| 2016/0315331 | A1* | 10/2016 | Yoshiwara | H01M 8/0234 |
| 2019/0031821 | A1 | 1/2019 | Kim et al. | |

OTHER PUBLICATIONS

Choe, Yoong-Kee et al., "Alkaline Stability of Benzyl Trimethyl Ammonium Functionalized Polyaromatics: A Computational and Experimental Study", *Chemical Materials* , 2014, 26, 5675-5682 and Supporting Information pp. 1-4.

Dumont, Joseph H. et al., "Earth abundant PGM-free model electrocatalysts for the Oxygen Reduction Reaction," Presentation given on May 23, 2017, RE[3] Workshop, 33 slides.

Jeon, Jong Yeob et al., "Synthesis of Aromatic Anion Exchange Membrane by Friedel-Crafts Bromoalkylation and Cross-linking of Polystyrene Block Copolymers", *Macromolecules* , 2019, 52, 2139-2147 and Supporting Information S1-S16.

Jiang, K. et al., "Efficient Oxygen Reduction Catalysis by Subnanometer Pt Alloy Nanowires," Science Advances 3, 2017.

Lee, Woo-Hyung et al. "Robust Hydroxide Ion Conducting Poly(biphenyl alkylene)s for Alkaline Fuel Cell Membranes", *ACS Macro Letters* , 2015, 4, 814-818 and Supporting Information S1-S16.

Lee, Woo-Hyung et al., "Poly(terphenylene) Anion Exchange Membranes: The Effect of Backbone Structure on Morphology and Membrane Property", *ACS Macro Letters* , 2017, 6, 566-570 and Supporting Information S1-S13.

Lee, Woo-Hyung et al. "Fluorene-Based Hydroxide Ion Conducting Polymers for Chemically Stable Anion Exchange Membrane Fuel Cells", *ACS Macro Letters* , 2015, 4, 453-457 and Supporting Information S1-S16.

Lee, Kwan-Soo et al., "An operationally flexible fuel cell based on quaternary ammoniumbiphosphate ion pairs", *Nature Energy* , 2016, 1, 16120, 1-7 and Supplementary Information pp. 1-13.

Li, Q. et al., "Nanocarbon Electrocatalysts for Oxygen Reduction in Alkaline Media for Advanced Energy Conversion and Storage," Advanced Energy Materials 4, 1301415-n/a, 2014, 19 pages.

Martinez, U. et al., "Critical role of intercalated water for electrocatalytically active nitrogen-doped graphitic systems," Science Advances 2, 2016.

Tran, C. et al., "Fabrication of porous carbon nanofibers with adjustable pore sizes as electrodes for supercapacitors," Journal of Power Sources, 2013, 235, 289-296.

* cited by examiner

100

US 11,456,463 B1

3D-PRINTED ELECTRODE, GAS DIFFUSION ELECTRODE (GDE) AND GAS DIFFUSION LAYER (GDL) FOR FUEL CELL APPLICATIONS

CROSS-REFERENCE TO RELATED APPLICATION

This application claims priority to and the benefit of U.S. Provisional Application No. 62/678,822, filed May 31, 2018 and titled "3D-PRINTED ELECTRODE, GAS DIFFUSION ELECTRODE (GDE) AND GAS DIFFUSION LAYER (GDL) FOR FUEL CELL APPLICATIONS", the entire content of which is incorporated herein by reference.

STATEMENT REGARDING GOVERNMENT RIGHTS

The United States government has rights in this invention pursuant to Contract No. 89233218CNA000001 between the United States Department of Energy/National Nuclear Security Administration and Triad National Security, LLC for the operation of Los Alamos National Laboratory.

BACKGROUND

Fuel cells are electrochemical devices that convert chemical energy into electrical energy. Such devices typically operate by reacting a fuel (such as hydrogen gas or an organic compound) with an oxidant (such as oxygen gas) so that electrons produced by oxidation of the fuel can be routed through an external circuit to provide direct current (DC) electrical power before being transferred to the oxidant. Fuel cell electrodes often include catalysts that enable the operative reduction and oxidation (redox) reactions to occur at lower voltages (overpotentials) and with higher current densities (rates).

Fuel cell performance may be affected by the structure of the components in the membrane electrode assembly (MEA), and in particular, by the structure of the electrodes. For example, the structure of the electrodes may affect the rate of mass transport of reactant and product molecules to and from the active sites of catalysts on the electrodes. When the structures of the electrodes in the MEA reduce or decrease the rate of mass transport to and from catalyst active sites, the power density of the fuel cell may be limited.

SUMMARY

According to embodiments of the present disclosure, an electrochemically active ink composition includes a homogeneous mixture of: a powdered precursor comprising a carbon source and a dopant source; and a polymer matrix.

In some embodiments, the powdered precursor may further include a metal-containing catalyst. In some embodiments, the metal-containing catalyst may include an iron (Fe) compound. In some embodiments, the iron (Fe) compound may include $FeCl_3$. In some embodiments, the metal-containing catalyst may include a platinum group metal compound.

In some embodiments, the dopant source may include nitrogen (N), fluorine (F), boron (B), phosphorus (P), and/or sulfur (S) atoms.

In some embodiments, the polymer matrix may include polyurethane, polydimethylsilane (PDMS), polyacrylonitrile (PAN), tetrafluoroethylene-perfluoro-3,6-dioxa-4-methyl-7-octenesulfonic acid copolymer) poly(ethylene oxide) (PEO), low molecular weight polyester, low molecular weight polyethylene, polyimide, polyetheretherketone (PEEK), polysulfone (PSU), polyethersulfone (PESU), polyarylene ether (PAE), polybenzimidazole, poly(4-vinylpyridine), poly(2-vinylpyridine), polyvinylidene difluoride (PVDF), polytetrafluoroethylene (PTFE), tertiary alkylaminated polyaromatic polymers, or a mixture thereof.

In some embodiments, the powdered precursor may further include a pore-forming material selected from a salt, a sugar, urea, a urea derivative, and combinations thereof.

In some embodiments, the ink composition after curing may have a surface area of 50 $m^2/g$ to 1,600 $m^2/g$.

According to embodiments of the present disclosure, a 3D printed electrode includes a substrate and a plurality of cured ink strands on the substrate, wherein the plurality of cured ink strands include the ink composition of claim 1 after curing. In some embodiments, the plurality of cured ink strands may be arranged in a face-centered tetragonal geometry. In some embodiments, the plurality of cured ink strands may be arranged in a cubic geometry. In some embodiments, the ink composition after curing may have a surface area of 50 $m^2/g$ to 1,600 $m^2/g$.

According to embodiments of the present disclosure, a fuel cell includes the 3D printed electrode. In some embodiments, the 3D printed electrode may be a cathode that is electrochemically active for an oxygen reduction reaction (ORR).

According to embodiments of the present disclosure, a method of preparing a printed electrode includes: mixing the powdered precursor and the polymer matrix to form the ink composition; 3D printing a plurality of ink strands from the ink composition on a substrate; and curing the plurality of ink strands to form the printed electrode.

In some embodiments, the method may further include pyrolyzing the printed electrode at a temperature of 500° C. to 900° C.

In some embodiments, the act of mixing the powdered precursor and the polymer matrix may further include mixing with a pore-forming material selected from a salt, a sugar, urea, a urea derivative, and combinations thereof. In some embodiments, the method may further include removing the pore-forming material from the printed electrode after curing. In some embodiments, the act of removing the pore-forming material from the printed electrode may include dissolving the pore-forming material in water.

BRIEF DESCRIPTION OF THE DRAWINGS

These and other features and advantages of embodiments of the present invention will be better understood by reference to the following detailed description when considered in conjunction with the accompanying drawings.

DETAILED DESCRIPTION

Figure 1A:
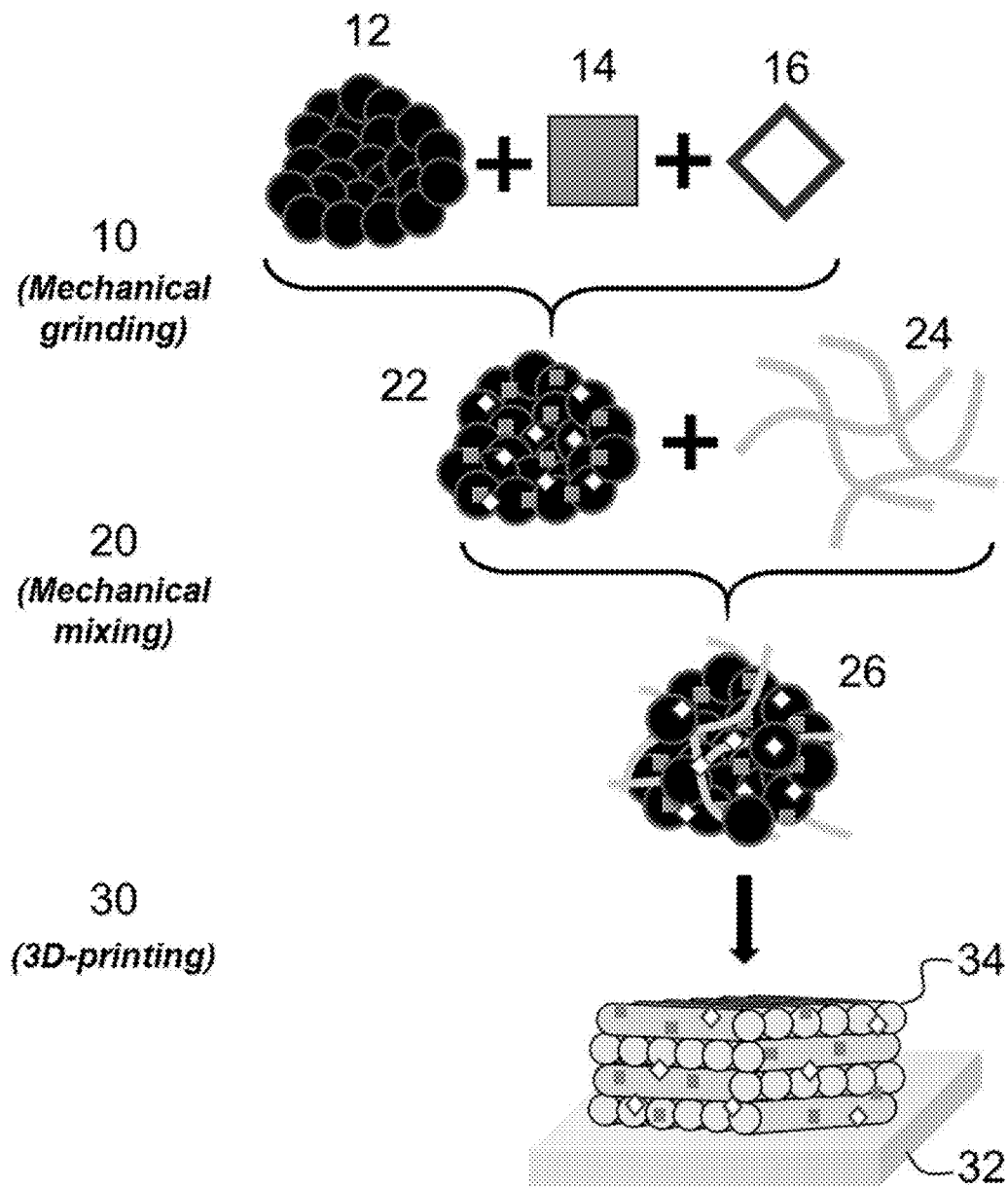
FIG. 1A is a flowchart and schematic diagram that illustrates the preparation of an example ink composition and an electrode printed using the ink composition, according to embodiments of the present disclosure.

According to aspects of example embodiments of the present disclosure, an ink composition may be used to print electrochemically active components (such as electrodes, etc.). One or more printed electrodes made from the ink may be used in an electrochemical device, and a fuel cell may include one or more of the printed electrodes. In some embodiments, a method of making the printed electrode includes printing the ink composition, and methods of catalyzing an electrochemical reaction (e.g., an anode or cathode reaction as required to produce current in a fuel cell) may use the printed electrode.

A desire for carbon dioxide-neutral and highly efficient energy sources, reliable backup power generation, and portable energy sources for transportation and consumer electronics has driven the development of electrochemical devices. Much of the developmental work on electrochemical devices that operate by way of bond-breaking and bond-forming redox reactions (such as in metal-air batteries, fuel cells, and electrolyzers that consume a feedstock or fuel) has focused on catalysts active towards such reactions. For example, research on fuel cells has been particularly focused on improving or developing new catalysts for the oxygen reduction reaction (ORR), which is described in more detail below. In particular, research has focused on developing more efficient catalyst materials having higher intrinsic reaction turnover rates.

However, mass transport is another limiting factor in many electrochemical reactions and devices. As used herein, the term "mass transport" is used in its art-recognized sense to collectively refer to the processes governing movement of electrochemically active species to and from an electrochemical active site in an electrode, including diffusion, migration, and/or convection. As such, even when an electrode includes a catalyst that is highly efficient, mass transport may limit turnover of the catalyst. For example, the ORR under acidic conditions produces water that must be removed from the active site of a catalyst before the next molecule of oxygen can interact with the catalyst. When the rate of oxygen mass transport to the active site and/or the rate of water mass transport from the active site is slow, the observed catalyst turnover rate may be decreased (e.g., may be limited by either transfer step).

The rates of mass transport may be influenced by various aspects of the structure of the electrode. For example, the thickness and density of a porous film including the catalyst on the electrode may affect the observed diffusion constants for molecules within the local environment of the electrode (e.g., within the porous film). For example, particular macro- or micro-structures such as channels, pores, protrusions, etc. may affect the number of effective diffusion paths to and from the active site. For example, the format, orientation, and geometry of the electrode may affect convection or flow of reactants and products through or past the electrode. Conventional methods of preparing electrocatalytically active electrodes have been limited in their ability to easily and precisely select and/or vary these structural parameters.

According to aspects of example embodiments of the present disclosure, additive manufacturing (AM) is used to quickly produce electrodes having consistent, adaptable, and high surface area structures that can be easily designed and/or controlled in all three dimensions. Additive manufacturing (AM) processes, such as stereolithography and three-dimensional (3D) printing, produce structures via layer-by-layer deposition of powder or liquid inks, which are subsequently cured, reacted, or otherwise transformed into layers of the desired solid structure.

In 3D printing, parts are manufactured via a stepwise deposition of layers of material on a substrate. 3D printing is directly analogous to two-dimensional (2D) printing, and the two differ primarily in the dimensionality of the manufactured product. In 2D printing, planar images and text are produced by a print head that successively deposits a single layer of ink, first along a line parallel to the x-axis, then subsequently along adjacent lines shifted along the y-axis and parallel to the first line. In 3D printing, an ink having a finite depth along the z-axis is deposited in a first plane according to substantially the same process for 2D printing, then subsequently in adjacent planes shifted along the z-axis and parallel to the first plane, thereby producing a solid volume. The layer-by-layer deposition of ink to form a solid volume may also be referred to as direct ink write (DIW).

According to embodiments of the present disclosure, additive manufacturing (for example, 3D printing), is used to produce new printed electrode structures, such as those used in electrochemically active materials for energy conversion and storage devices. These new electrode structures allow fine-tuning and variation of the macro- and microstructure of the electrode and active sites on the electrode, thereby enabling higher device activities and efficiencies. During 3D printing, an ink for forming the electrode is extruded through a printer nozzle (e.g., a printer head or micronozzle) to form a series of stacked layers. The stacked layers of ink may then be cured to form a solidified electrode.

In some embodiments, the ink used for forming the electrode via 3D printing may itself be electrochemically active for the reaction and application of interest, and/or may be capable of forming an electrochemically active material. Furthermore, the ink may be capable of being dispensed smoothly and evenly from the printer nozzle, without clogging (or while minimizing the amount of clogging) or forming unwanted flow discontinuities (or while minimizing such flow discontinuities). The ink may also be liquid, flowable, and stable at suitable storage and operating temperatures (for example, at or above 25° C., or in some embodiments at about 25° C. to about 100° C.), have a sufficiently long working life or pot life or shelf life (e.g., be stable in liquid ink form during storage and printing), and have suitable rheological properties (e.g., viscosity, elastic modulus, and storage modulus) so that the printed structure does not sag, melt, or otherwise deform into an unwanted shape prior to solidification.

The electrodes produced according to embodiments of the present disclosure may be used in various electrical and electrochemical applications, including batteries, flow batteries, supercapacitors, electrolyzers, fuel cells, etc. In some embodiments, the electrodes may be used in a fuel cell device. The type or chemistry of the fuel cell device is not specifically limited. In some embodiments, for example, the fuel cell may be a proton exchange membrane fuel cell (PEMFC). In some embodiments, the electrode may be a gas diffusion electrode (GDE). In some embodiments, the electrode may be included in a gas diffusion layer (GDL).

Similarly, the electrodes produced according to embodiments of the present disclosure may be integrated with catalysts used for various suitable redox (electrochemical reduction and/or oxidation) reactions in electrochemical devices. The type or kind of redox reaction is not particularly limited, but may depend on the type, kind, or purpose of the device, the chemicals (e.g., fuels and/or electron carriers) present in the device environment, and/or the electrocatalytic activity of the electrode or the catalyst included in the electrode, etc. In some embodiments, when the device is a fuel cell device, the operative redox reactions may include one or more of the oxygen reduction reaction (ORR), the oxygen evolution reaction (OER), the hydrogen evolution reaction (HER), the hydrogen oxidation reaction (HOR), etc. As used herein, the term "ORR" (and like terms) is used in its art-recognized sense to refer to a reaction in which oxygen is reduced to form water or hydroxide; the term "OER" (and like terms) is used in its art-recognized sense to refer to a reaction in which water or hydroxide is oxidized to yield oxygen; the term "HER" (and like terms) is used in its art-recognized sense to refer to a reaction in which protons are reduced to $H_2$; and the term "HOR" (and like terms) is used in its art-recognized sense to refer to a reaction in which hydrogen is oxidized to protons. The particular operative mechanism(s) of the operative redox reaction(s) are not limited to any particular stated reaction or mechanism, and may vary according to a number of factors such as pH, concentration, catalyst involvement, etc. that are known to those having ordinary skill in the art.

In some embodiments, the operative redox reactions of a device may include the ORR. A set of equations describing the ORR under acidic and alkaline (basic) conditions are described in Table 1:

TABLE 1

| | Acidic | Alkaline |
|---|---|---|
| Overall reaction or single step 4e$^-$ mechanism | $O_2 + 4H^+ + 4e^- \rightarrow 2H_2O$ | $O_2 + 2H_2O + 4e^- \rightarrow 4OH^-$ |
| Two-step 2e$^-$ + 2e$^-$ mechanism | $O_2 + 2H^+ + 2e^- \rightarrow H_2O_2$<br>$H_2O_2 + 2H^+ + 2e^- \rightarrow 2H_2O$ | $O_2 + H_2O + 2e^- \rightarrow HO_2^- + OH^-$<br>$HO_2^- + H_2O + 2e^- \rightarrow 3OH^-$ |

The half reactions in the first row of Table 1 represent the 4 electron reduction of $O_2$ taking place via a single step (e.g., the four electrons are transferred substantially simultaneously such that an intermediate product or reduction state is generally not isolable) under acidic and alkaline conditions, respectively. The half reactions in the first row may also represent the overall (additive) half reaction for the 4 electron reduction of $O_2$ taking place via multiple steps.

The two half reactions in the second row of Table 1 represent the 4 electron reduction of $O_2$ taking place via a first two-electron reduction step to produce hydrogen peroxide or a deprotonated hydrogen peroxide anion under acidic and alkaline conditions, respectively, followed by a second two-electron reduction step to produce water or hydroxide under the same respective conditions.

In some embodiments, the ORR may take place at the cathode of a fuel cell device, where electrons that have been harvested from fuel at the anode and passed through the external circuit are subsequently transferred to $O_2$ at the surface of the cathode to balance the reaction(s) taking place at the anode.

In some embodiments, the electrode may include a catalyst (electrocatalyst) for the particular operative reaction(s) at the electrode. The term "catalyst" is used herein in its art-recognized sense to refer to a material that increases the rate of a chemical reaction, e.g., by decreasing the activation energy required for reaction, without itself being permanently changed or used up; and the term "electrocatalyst" is used herein in its art-recognized sense to further refer to a material that increases the rate of one or more electron transfer steps in an electrochemical reaction. Further, with respect to a redox reaction, the catalyst (electrocatalyst) may decrease the potential required to initiate the reaction, or in other words, decrease the overpotential for the reaction. The term "overpotential" is used herein in its art-recognized sense to refer to the voltage (energy) difference between the voltage required for onset of the reaction and the voltage corresponding to the standard reduction potential. As such, the catalyst may enable the electrode to achieve a higher current density at a lower overpotential. The catalyst may be a heterogeneous catalyst that is deposited on the surface of and/or within the electrode material.

The type or kind of catalyst is not particularly limited as long as it is sufficiently active for the particular electrochemical application. The activity of the catalyst can be assessed in terms of the rate of the catalyst (observed as limiting current density at the electrode), the efficiency of the catalyst (observed as the overpotential, voltage onset, and/or half-wave voltage), the selectivity of the catalyst for a desired reaction or product, and the stability and lifetime of the catalyst (observed as stability of the current over operation time). Those having ordinary skill in the art are capable of identifying suitable catalysts for a particular application. For example, a fuel cell device may include a cathode including a catalyst for the ORR, as produced from an electrochemically active ink composition according to embodiments of the present disclosure and further described herein.

According to some embodiments of the present disclosure, an electrochemically active ink composition includes a homogenous mixture of a carbon source and a polymer matrix. In some embodiments, the homogenous mixture may further include a dopant source and/or a metal-containing catalyst. For example, the carbon source, dopant source, and/or metal-containing catalyst may be suspended or dispersed throughout the polymer matrix.

The carbon source in the ink composition may be any carbon source that is commonly used for electrochemical applications. For example, the carbon source may be conductive, and may thus be used to mediate electron collection and transfer between the electrode and the external circuit. Non-limiting examples of the carbon source include graphite, carbon nanotubes, fullerenes, graphene, carbon black, acetylene black, crystalline carbon, amorphous carbon, and mixtures thereof. In some embodiments, the carbon source may include graphite, carbon nanotubes, fullerenes, carbon black, or a mixture thereof. In some embodiments, the carbon source may include active sites capable of catalyzing or initiating an operative reaction of the device. For example, the ORR may be observed on carbon electrodes, albeit at limited current densities, higher overpotentials, or with reduced selectivity compared to later-described embodiments.

In some embodiments, the ink composition may optionally further include a dopant source. The dopant source may react with the carbon source to deposit a dopant on the carbon source (e.g., to produce doped carbon). The dopant source and/or the doped carbon may impart increased electrochemical and/or electrocatalytic activity to the electrode for the operative fuel cell reaction. In particular, the dopant source and/or the doped carbon may have improved catalytic activity for a particular reaction of interest (e.g., a lower overpotential, a higher current density, and/or higher selectivity) compared to the carbon source alone. For example, nitrogen doped carbon may have enhanced electrocatalytic activity for the ORR, compared to carbon (e.g., the carbon source) on its own.

The dopant source may include any suitable material that is capable of doping the carbon source or being deposited on/within the carbon source when the two substances are mixed or combined. In some embodiments, the dopant source may include nitrogen (N), fluorine (F), boron (B), phosphorus (P), and/or sulfur (S) atoms. The dopant source may include a single type (element) of dopant, or a combination of two or more types (elements) of dopants. The N, F, B, P, and/or S atoms in the dopant source, and/or moieties containing those atoms may be deposited on or in the carbon source to produce a correspondingly doped carbon. In some embodiments, for example, the dopant source and the carbon source may combine to produce nitrogen-doped carbon. In some embodiments, the dopant source and the carbon source may combine to produce fluorine-doped carbon, boron-doped carbon, phosphorus-doped carbon, and/or sulfur-doped carbon.

In some embodiments, the dopant source may be a solid or liquid state substance that is mixed with the carbon source and other ink components during preparation of the ink composition. In some embodiments, the dopant source may be a gas, and may be deposited on the carbon source by exposing the ink composition or its components to the gas before printing, or exposing the printed electrode to the gas at some point during printing and/or annealing, as described in more detail below.

In some embodiments, when the dopant source includes nitrogen and is used to produce nitrogen-doped carbon, the dopant source may include any suitable nitrogen source. Non-limiting examples of suitable such nitrogen (dopant) sources include urea, ammonia gas, phenanthroline, melamine, hydroxylamine hydrochloride, cyanamide, aniline, polyaniline, and derivatives or mixtures thereof. In some embodiments, when the dopant source includes fluorine and is used to produce fluorine-doped carbon, any suitable fluorine source may be used. Non-limiting examples of suitable such fluorine (dopant) sources include fluorinated monomers or surfactants, (such as, for example, perfluorooctanesulfonic acid (PFOS), perfluorooctanoic acid (PFOA), perfluorononanoic acid (PFNA), perfluorohexanoic acid (PFHxA), perfluorobutanesulfonic acid, and perfluorobutane sulfonate (PFBS)), fluorinated polymers (such as, for example, Nafion or tetrafluoroethylene-perfluoro-3,6-dioxa-4-methyl-7-octenesulfonic acid copolymer), fluorinated organic compounds (such as, for example, trifluorotoluene), fluorine salts (such as, for example, ammonium fluoride), and derivatives or mixtures thereof. In some embodiments, when the dopant source includes boron and is used to produce boron-doped carbon, the dopant source may include any suitable boron source. Non-limiting examples of suitable such boron (dopant) sources include boric acid, boron carbide, triphenylborane, boron trioxide, and derivatives or mixtures thereof. In some embodiments, when the dopant source includes sulfur and is used to produce sulfur-doped carbon, the dopant source may include any suitable sulfur source. Non-limiting examples of suitable such sulfur (dopant) sources include $H_2SO_4$, sulfates (such as, for example, ferric sulfate), and derivatives or mixtures thereof. In some embodiments, when the dopant source includes phosphorus and is used to produce phosphorus-doped carbon, the dopant source may include any suitable phosphorus source. Non-limiting examples of suitable such phosphorus (dopant) sources include $H_3PO_4$, phosphorus trichloride, phosphorus pentoxide, triphenylphosphine, and derivatives or mixtures thereof.

In some embodiments, for example when the electrode is annealed during post-processing, as discussed herein, the dopant source may be pyrolyzed. Further, some of the elements included in the dopant source (such as carbon, hydrogen, and oxygen) may be converted into a gas and removed from the electrode, thereby leaving the remaining dopant atoms absorbed to the carbon source. For example, when an electrode including triphenylborane as the dopant source is annealed, the carbon and hydrogen atoms may be removed as $CO_2$, CO, and $H_2O$, leaving the boron atoms in the carbon as a dopant.

In some embodiments, the ink composition may optionally further include a metal-containing catalyst. The metal-containing catalyst in the ink composition may have catalytic activity that is tailored or selected for a particular reaction of interest compared to the carbon source alone, and/or compared to the combination of carbon source and dopant source. In some embodiments, for example, the metal-containing catalyst may have enhanced electrocatalytic activity for the ORR.

In some embodiments, the metal-containing catalyst active for the ORR may include a platinum (Pt) group metal (PGM) catalyst. Non-limiting examples of such PGM catalysts include an alloy or metal particle or nanoparticle including Pt, rhodium (Rh), ruthenium (Ru), palladium (Pd), iridium (Ir), gold (Au), or a mixture thereof; an inorganic Pt, Rh, Ru, Pd, Ir, or Au salt or compound; an organometallic complex in which a Pt, Rh, Ru, Pd, or Ir atom is complexed with one or more organic or inorganic ligands; or a combination thereof.

In some embodiments, when the metal-containing catalyst includes Pt, the catalyst may be added in any suitable form, for example, platinum metal particles, hexachloroplatinic acid, potassium hexachloroplatinate, platinum black, or a mixture thereof. In some embodiments, when the catalyst includes Pd, the catalyst may be added in any suitable form, for example, palladium black, palladium chloride, palladium sulfate, palladium acetate, palladium acetylacetonate, or a mixture thereof. In some embodiments, when the catalyst includes Ru, the catalyst may be added in any suitable form, for example, ruthenium black, ruthenium chloride, ruthenium acetylacetonate, or a mixture thereof. In some embodiments, when the catalyst includes Au, the catalyst may be added in any suitable form, for example, gold chloride. In some embodiments, the metal-containing catalyst may form nanoparticles of the metal during processing of the ink or electrode.

In some embodiments, the metal-containing catalyst may include a non-PGM catalyst, for example, a transition metal, a transition metal-containing material, and/or a transition metal complex. For example, in some embodiments, the metal-containing catalyst may include a relatively abundant transition metal, such as titanium (Ti), chromium (Cr), manganese (Mn), iron (Fe), cobalt (Co), nickel (Ni), zinc (Zn), molybdenum (Mo), and/or copper (Cu). In some embodiments, the metal-containing catalyst may include alloy or metal particles or nanoparticles of the transition metal (e.g., Ti, Cr, Mn, Fe, Co, Ni, Zn, Mo, and/or Cu). In some embodiments, the metal-containing catalyst may be a salt or compound of the transition metal (e.g., Ti, Cr, Mn, Fe, Co, Ni, Zn, Mo, and/or Cu). In some embodiments, the metal-containing catalyst may be a transition metal complex of the transition metal (e.g., Ti, Cr, Mn, Fe, Co, Ni, Zn, Mo, and/or Cu). In some embodiments, the catalyst may be a Fe transition metal complex, for example, a Fe—$N_4$ organometallic complex (e.g., iron coordinated with a ligand or set of ligands having four nitrogen atoms). In some embodiments, the ligand in the organometallic complex may act as a dopant upon reacting with the carbon source. In some embodiments, atoms of the metal may form a complex or other interaction with the doped carbon source or carbon source. In some embodiments, the metal-containing catalyst may be added in the form of a metal-organic framework (MOF). The terms "metal-organic framework" and "MOF" are interchangeably used herein in their art-recognized senses to refer to a coordination polymer including metals that are coordinated with multidentate ligands to form a repeating chain along one, two, or three dimensions.

In some embodiments, when the metal-containing catalyst includes Fe, the catalyst may be added in any suitable form. In some embodiments, the metal containing catalyst including Fe may be added as a salt form. Some non-limiting examples of suitable Fe-containing components include iron chloride, iron sulfate, iron nitrate, ferrocene, a mixtures thereof. In some embodiments, when the metal-containing catalyst includes Zn, the catalyst may be added in any suitable form, for example, a salt form. Some non-limiting examples of suitable Zn-containing components include zinc chloride, zinc sulfate, zinc nitrate, and mixtures thereof. In some embodiments, when the metal-containing catalyst includes Co, the catalyst may be added in any suitable form, for example, a salt form. Some non-limiting examples of suitable Co-containing components include cobalt chloride, cobalt sulfate, cobalt nitrate, and mixtures thereof. In some embodiments, when the metal-containing catalyst includes Ni, the catalyst may be added in any suitable form, for example, a salt form. Some non-limiting examples of suitable Ni-containing components include nickel chloride, nickel sulfate, nickel nitrate, and mixtures thereof. In some embodiments, when the metal-containing catalyst includes Mo, the catalyst may be added in any suitable form, a non-limiting example of which includes powdered $MoS_2$.

In some embodiments, the metal-containing catalyst included in the electrode may include a combination or mixture of any two or more suitable catalysts, such as the above-described catalysts. However, embodiments of the present disclosure are not limited thereto, and those having ordinary skill in the art are capable of identifying other suitable catalysts for a desired electrode, including an ORR electrode.

According to embodiments of the present disclosure, the polymer matrix is included in the ink composition to provide a curable scaffold for the other electrode materials. For example, the polymer matrix may be provided as a liquid mixture of monomers and/or oligomers that can react (e.g., polymerize) to form a solid material, and thereby give the electrode a solid form. In some embodiments, the polymer matrix may be electrocatalytically inert. Any polymer matrix may be used as long as it can be cured under suitable processing conditions, maintains a stable, solid structure upon pyrolysis or annealing (if applied), and has suitable viscoelastic properties, as discussed herein. In some embodiments, the polymer matrix may include polyurethane, polydimethylsilane (PDMS), polyacrylonitrile (PAN), Nafion (tetrafluoroethylene-perfluoro-3,6-dioxa-4-methyl-7-octenesulfonic acid copolymer), poly(ethylene oxide) (PEO), low molecular weight polyester, low molecular weight polyethylene, or derivatives or mixtures thereof. As used herein, the term "low molecular weight polyester" may refer to a polyester having a number average molecular weight ($M_n$) of about 20,000 or less. The term "low molecular weight polyethylene" may refer to a polyethylene having a number average molecular weight ($M_n$) of about 100,000 or less. In some embodiments, the polymer matrix may include an engineered polymer, such as polyimide, polyetheretherketone (PEEK), polysulfone (PSU), polyethersulfone (PESU), polyarylene ether (PAE), polybenzimidazole, poly(4-vinylpyridine), poly(2-vinylpyridine), polyvinylidene difluoride (PVDF), polytetrafluoroethylene (PTFE), tertiary alkylaminated polyaromatic polymers (e.g., a polymer including aromatic groups and tertiary alkylamine groups), or mixtures thereof.

Non-limiting examples of tertiary alkylaminated polyaromatic polymers are described in e.g., U.S. Patent Publication No. 2019/0031821, filed Jul. 18, 2018 and titled "Poly (phenylene)-based anion exchange polymers and methods thereof"; U.S. Pat. No. 10,053,535, filed Jan. 4, 2017, granted Aug. 21, 2018 and titled "Poly(phenylene)-based anion exchange polymers and methods thereof"; U.S. Pat. No. 9,534,097, filed Apr. 23, 2015, granted Jan. 3, 2017 and titled "Poly(phenylene alkylene)-based Ionomers"; U.S. patent application Ser. No. 16/428,803, filed titled "Polyaromatic Electrolytes for Alkaline Membrane Fuel Cells," naming Triad National Security, LLC as Applicant, and Yu Seung Kim, Eun Joo Park and Sandipkumar Maurya as inventors, and claiming priority to U.S. Provisional Application No. 62/678,832, filed May 31, 2018 and titled "Polyaromatic Electrolytes for Alkaline Member Fuel Cells"; U.S. Pat. No. 9,051,431, filed Mar. 13, 2013, granted Jun. 9, 2015 and titled "Poly(arylene)-based Anion Exchange Polymer Electrolytes"; Lee, Woo-Hyung et al. "Robust Hydroxide Ion Conducting Poly(biphenyl alkylene)s for Alkaline Fuel Cell Membranes", *ACS Macro Letters,* 2015, 4, 814-818 and Supporting Information S1-S16; Jeon, Jong Yeob et al., "Synthesis of Aromatic Anion Exchange Membrane by Friedel-Crafts Bromoalkylation and Cross-linking of Polystyrene Block Copolymers", *Macromolecules,* 2019, 52, 2139-2147 and Supporting Information S1-S16; Lee, Woo-Hyung et al. "Poly(terphenylene) Anion Exchange Membranes: The Effect of Backbone Structure on Morphology and Membrane Property", *ACS Macro Letters,* 2017, 6, 566-570 and Supporting Information S1-S13; Lee, Woo-Hyung et al. "Fluorene-based Hydroxide Ion Conducting Polymers for Chemically Stable Anion Exchange Membrane Fuel Cells", *ACS Macro Letters,* 2015, 4, 453-457 and Supporting Information S1-S16; Choe, Yoong-Kee et al., "Alkaline Stability of Benzyl Trimethyl Ammonium Functionalized Polyaromatics: A Computational and Experimental Study", *Chemical Materials,* 2014, 26, 5675-5682 and Supporting Information pgs. 1-4; and Lee, Kwan-Soo et al., "An operationally flexible fuel cell based on quaternary ammonium-biphosphate ion pairs", *Nature Energy,* 2016, 1, 16120, 1-7 and Supplementary Information pgs. 1-13, the entire contents of all of which are hereby incorporated by reference.

The carbon source, the dopant source, and/or the metal-containing catalyst may each be provided as powders. As such, when referring to a mixture of these components, they may be collectively referred to as powdered precursors.

The carbon source may have any suitable density, surface area, or particle size. Those of ordinary skill in the art would be capable of selecting an appropriate density, surface area, and/or particle size for the carbon source based on the intended use or application of the electrode. For example, the carbon source may have a surface area of about 50 $m^2/g$ to about 1,600 $m^2/g$, about 200 $m^2/g$ to about 1,200 $m^2/g$, or about 400 $m^2/g$ to about 800 $m^2/g$, and in some embodiments, about 50 $m^2/g$ to about 300 $m^2/g$, about 100 $m^2/g$ to about 250 $m^2/g$, about 150 $m^2/g$ to about 250 $m^2/g$. The carbon source may have a particle size of about 10 nm to about 100 µm, for example, about 100 nm to about 50 µm, about 200 nm to about 20 µm, about 500 nm to about 10 µm, or about 1 µm to about 5 µm. The carbon source may be included in the ink composition in an amount of about 0 wt % to about 75 wt % with respect to the total amount of powdered precursors, for example, about 1 wt % to about 70 wt %, about 10 wt % to about 65 wt %, about 20 wt % to about 60 wt %, about 30 wt % to about 55 wt %, or about 40 wt % to about 60 wt %.

The dopant source may have any suitable density, surface area, or particle size. Those of ordinary skill in the art would be capable of selecting an appropriate density, surface area and/or particle size for the dopant source based on the intended use or application of the electrode. The dopant source may have a particle size of about 1 nm to about 10 µm, for example, about 10 nm to about 5 µm, about 50 nm to about 1 µm, about 100 nm to about 800 nm, or about 250 nm to about 500 nm. The dopant source may be included in the ink composition in an amount of about 0 wt % to about 50 wt % with respect to the total amount of powdered precursors, for example, about 1 wt % to about 45 wt %, about 5 wt % to about 40 wt %, about 10 wt % to about 35 wt %, about 15 wt % to about 30 wt %, or about 20 wt % to about 25 wt %.

The metal-containing catalyst may be added in any suitable form or particle size. Those of ordinary skill in the art would be capable of selecting an appropriate density, surface area and/or particle size for the metal-containing catalyst based on the intended use or application of the electrode. In some embodiments, the metal-containing catalyst may have a particle size of about 1 nm to about 10 µm, for example, about 10 nm to about 1 µm, about 50 nm to about 1 µm, about 100 nm to about 800 nm, or about 250 nm to about 500 nm. The metal-containing catalyst may be included in an amount of about 0 wt % to about 50 wt % with respect to the total amount of powdered precursors, for example, about 1 wt % to about 45 wt %, about 5 wt % to about 40 wt %, about 10 wt % to about 35 wt %, about 15 wt % to about 30 wt %, or about 20 wt % to about 25 wt %.

Before being added to the polymer matrix, the powdered precursors (e.g., the carbon source, metal source, and/or metal-containing catalyst) may be mixed and/or ground together to produce a mixed powdered precursor having particles with a uniform size, shape, and spatial distribution. The method of mixing used to make the mixed powdered precursor is not particularly limited as long as it is suitable for mixing solid particles, and non-limiting examples of such techniques include ball milling and mechanical grinding.

The mixed powdered precursor may be subsequently added to the polymer matrix to form the ink composition, or printable (print-ready) ink. The relative amounts of the mixed powdered precursor and the polymer matrix may be selected to balance printability and durability of the printed structure (as imparted by the polymer matrix) with a desire for higher electrocatalytic activity (as imparted by a higher catalyst loading, or density). For example, in some embodiments, the mixed powdered precursor may be included in the ink composition in an amount of about 0 wt % to about 50 wt % with respect to the total amount of the ink composition (i.e., the total amount of the combination of the polymer matrix and the mixed powdered precursor), for example, about 1 wt % to about 45 wt %, about 5 wt % to about 40 wt %, about 10 wt % to about 35 wt %, about 15 wt % to about 30 wt %, or about 20 wt % to about 25 wt %. The polymer matrix may be included in the ink composition in an amount of about 0 wt % to about 100 wt % with respect to the total amount of the ink composition (or printable ink), for example, about 10 wt % to about 90 wt %, about 20 wt % to about 80 wt %, about 30 wt % to about 70 wt %, about 40 wt % to about 65 wt %, or about 50 wt % to about 60 wt %.

The mixed powdered precursor and the polymer matrix may be mixed together to adequately incorporate and distribute the mixed powdered precursor in the matrix. The method of mixing is not particularly limited as long as it is suitable for forming a semi-solid material or suspension, and a non-limiting example of such a technique includes planetary centrifugal mixing. In some embodiments, the mixed powdered precursor and the polymer matrix may be mixed under vacuum to form the ink composition.

In some embodiments, the ink composition may further optionally include a pore-forming material (also interchangeably referred to herein as a "sacrificial compound") to increase the porosity of the electrode printed from the ink composition. The pore-forming material may be suspended or substantially uniformly distributed within the ink composition after mixing and during printing (deposition) and curing, and may be subsequently selectively removed to thereby leave an opening or pore in the surrounding printed electrode material. The removal may be accomplished after curing, during pyrolysis, or after pyrolysis, depending on the chemical properties of the pore-forming material. The pore-forming material may be selected so that it does not substantially react with the other components, for example, so that it does not form one or more bonds (e.g., covalent bonds) that would interfere with its selective removal.

In some embodiments, the pore-forming material may include materials or moieties that are converted to gases upon annealing, pyrolysis, or exposure to temperatures above the working temperature of the electrochemical device, such that particles of the pore forming material in the ink composition and/or electrode are converted to gas and thereby removed from the ink and/or electrode, leaving behind a pore. Any suitable such pore-forming material may be used, for example, the pore-forming material may be an organic or carbonaceous material that is converted into $CO_2$, CO, and/or $H_2O$ upon heating. In some embodiments, for example, the pore-forming material may be a sacrificial organic polymer. In some embodiments, the pore-forming material may additionally act as a carbon and/or dopant source, and may further deposit carbon and/or dopant atoms in the electrode. For example, the pore-forming material may be or include urea or a urea derivative, a portion of which may be converted to ammonia gas and a portion of which may deposit nitrogen atoms as a dopant. In some embodiments, for example, the pore-forming material may be or include a metal chloride salt that forms $Cl_2$ and deposits the metal atom as metallic particles. The pore-forming material may be a single material, or a mixture (combination) of two or more materials. For example, when the pore-forming material includes a combination of materials, pores having different sizes and/or dopant concentrations may be formed.

In some embodiments, the pore-forming material may be a material that can be selectively dissolved from the printed electrode material, for example, after curing and/or after pyrolysis. For example, the pore-forming material may be soluble in one or more solvents that are incapable of dissolving the printed electrode material and/or its other components (e.g., the metal catalyst). The pore-forming material and the printed electrode material may thus have different degrees of polarity to facilitate the selective solubility. In some embodiments, for example, the pore-forming material may be a highly polar compound that can be selectively dissolved using a polar solvent, such as water. As used herein, the term "highly polar" refers to the property of having a polarity index greater than 4, for example, greater than 5, or greater than 7.

In some embodiments, for example, the pore-forming material may be a salt (e.g., an ionic compound including a cation and anion) that is soluble in a polar solvent, such as water. The cation may be a polyatomic cation (such as, e.g., $NH_4^+$), or a metal cation (such as, e.g., an alkali metal cation, an alkaline earth metal cation, or a transition metal cation). The anion may be a polyatomic anion, and for example, may be or include a phosphite, phosphate, acetate, nitrate, nitrite, bicarbonate, carbonate, sulfate, perchlorate, or halide (e.g., fluoride, chloride, bromide, iodide, etc.) anion. The salt may be provided in any suitable form, such as, e.g., an anhydrous compound or as a hydrate. Non-limiting examples of the nitrate or nitrite salt include $NH_4NO_3$, $NaNO_3$, $KNO_3$, $Mn(NO_3)_2$, $Co(NO_3)_2$, etc. Non-limiting examples of the carbonate or bicarbonate salt include $NaHCO_3$, $Na_2CO_3$, $K_2CO_3$, $NH_4HCO_3$, and $(NH_4)_2CO_3$. Non-limiting examples of the sulfate salt include $Na_2SO_4$, $CaSO_4$, $NiSO_4 \cdot 6H_2O$, $MgSO_4 \cdot 7H_2O$, $Ce(SO_4)_2$, etc. Non-limiting examples of the perchlorate salt include $Ni(ClO_4)_2 \cdot 6H_2O$, $Co(ClO_4)_2 \cdot 6H_2O$, etc. Non-limiting examples of the halide salt include $NH_4Cl$, NaCl, KCl, etc.

In some embodiments, the pore-forming material may be a water-soluble or combustible organic compound, and for example, may be a sugar. For example, the sugar may be selectively dissolved, similar to the salt materials described above, and/or the sugar may be annealed or pyrolyzed to deposit carbon and/or be converted to $CO_2$, $H_2O$, etc., depending on the pyrolysis conditions. Any suitable sugar may be used. The sugar may be a monosaccharide, an oligosaccharide (for example, a saccharide having from 2-4 monomer units), or a polysaccharide (for example, a saccharide having 5 or more monomer units). Non-limiting examples of suitable monosaccharide sugars include fructose, galactose, and glucose. Non-limiting examples of suitable oligosaccharides include lactose, maltose, and sucrose. Non-limiting examples of suitable polysaccharides include cellulose and cellulose derivatives.

In some embodiments, when urea is included in the pore-forming material as described above, the urea may alternatively be removed by selective dissolution (e.g., in water), in addition to or instead of being converted to gas.

In some embodiments, the pore-forming material may be selected from materials that do not include anions capable of binding to or forming a complex with the metal-containing catalyst, which would interfere with catalyst activity. For example, when the metal-containing catalyst or metal precursor is a PGM metal (such as Pt), the pore-forming material may exclude (e.g., may not include) halide atoms, such as chloride.

In some embodiments, the pore-forming material may be selected from materials that can be selectively removed by etching (e.g., selective dissolution in acid). In some embodiments, for example, the pore-forming material may be silica or functionalized silica (including commercially available silica particles such as those manufactured by Cab-o-sil®), which can be subsequently removed by washing with hydrofluoric acid (HF).

The amount of pore-forming material may be selected according to the desired porosity of the electrode. In some embodiments, the pore-forming material may be a solid that is provided as a particle, and the particle size (diameter) of the pore-forming material may be selected according to the desired average size (diameter) of the pores. In some embodiments, for example when the pore-forming material is a salt or sugar, the salt or sugar may have an average particle size of about 1 μm to about 50 μm, for example, about 10 μm to about 40 μm, or about 20 μm to about 30 μm. In some embodiments, for example when the pore-forming material is urea or a urea derivative, the urea or urea derivative may have an average particle size of about 1 μm to about 100 μm, for example, about 10 μm to about 90 μm, about 20 μm to about 80 μm, about 30 μm to about 70 μm, about 40 μm to about 60 μm, or about 40 μm to about 50 μm.

In some embodiments, the pore-forming material may be included in the powdered precursors and thus be a part of the mixed powdered precursor, and may be present in the mixed powdered precursor in an amount of about 1 wt % to about 30 wt % with respect to the total amount of powdered precursors in the mixed powdered precursor, for example, about 1 wt % to about 25 wt %, about 5 wt % to about 20 wt %, or about 10 wt % to about 15 wt %. In some embodiments, the pore-forming material may be added to the polymer matrix along with the mixed powdered precursor, and may be present in the ink composition in an amount of about 1 wt % to about 30 wt % with respect to the total weight of the ink composition, for example, about 1 wt % to about 25 wt %, about 5 wt % to about 20 wt %, or about 10 wt % to about 15 wt %.

In some embodiments, the ink composition may further optionally include a solvent to modify the ink composition's viscoelastic properties, dissolve one or more monomer or oligomers, and/or facilitate mixing of the ink composition and/or extrusion of the ink composition during printing. In some embodiments, when the polymer matrix is obtained from a commercial source, the polymer matrix as provided may include at least a portion of the solvent. The solvent may be an organic solvent that does not irreversibly react with any of the components in the ink composition. Non-limiting examples of suitable organic solvents include N-methyl-2-pyrrolidone (NMP), xylenes, toluene, etc., and mixtures thereof. The solvent is not particularly limited, however, and those of ordinary skill in the art would be capable of selecting an appropriate solvent for this purpose based on the solvent present in the commercial source (if present) and based on the desired properties or functions of the ink composition. Additionally, the amount of solvent may be selected according to the desired properties of the ink composition.

In some embodiments, the ink composition may further optionally include a filler material to modify the ink composition's viscoelastic properties, including, for example, increasing the storage modulus of the ink composition. Any suitable filler material may be used, non-limiting examples of which include silica and functionalized silica (including commercially available silica particles such as those manufactured by Cab-o-sil®). The filler material, however, is not particularly limited, and those of ordinary skill in the art would be capable of selecting an appropriate filler material based on the desired properties or functions of the ink composition.

In some embodiments, the filler material may be included in the powdered precursors and thus be a part of the mixed powdered precursor, and may be present in the mixed powdered precursor in an amount of about 1 wt % to about 30 wt % with respect to the total amount of powdered precursors in the mixed powdered precursor, for example, about 1 wt % to about 25 wt %, about 5 wt % to about 20 wt %, or about 10 wt % to about 15 wt %. In some embodiments, the filler material may be added to the polymer matrix along with the mixed powdered precursor, and may be present in the ink composition in an amount of about 1 wt % to about 30 wt % with respect to the total weight of the ink composition, for example, about 1 wt % to about 25 wt %, about 5 wt % to about 20 wt %, or about 10 wt % to about 15 wt %.

The overall ink composition may have viscoelastic properties that enable the ink to be dispensed smoothly and evenly from the printer nozzle while liquid, but have a sufficiently low degree of long-term relaxation so that the printed structure does not sag or deform before curing is complete. The viscosity of the ink composition, which affects the consistency and ease of dispensing, may be balanced with the elasticity of the ink composition, which allows the ink to hold its shape and porosity while being cured. The crossover point of the G' storage modulus and the G" loss modulus (e.g., the pressure at which G'=G") for the ink composition may be suitably used as the extrusion pressure for ink at the nozzle. The extrusion pressure may be less than the maximum pressure allowable for the 3D printer. In some embodiments, the G'=G" crossover point (e.g., extrusion pressure) may be less than about 100 psi (about 690 kPa), for example, about 0.1 kPa to 500 kPa, about 1 kPa to about 250 kPa, or about 10 kPa to about 100 kPa.

In some embodiments, the ink composition may have a yield stress of about 10 Pa to about 10,000 Pa, for example, about 100 Pa to about 9,000 Pa, or about 1,000 Pa to about 8,000 Pa.

The ink composition may be deposited (printed) on a substrate. Any suitable substrate may be used as the substrate. In some embodiments, for example, the substrate may include glass and/or polycarbonate. In some embodiments, the substrate may be or include a layer of conductive metal (such as, for example, aluminum, silver, copper, or gold), glassy carbon, or ceramic (such as, for example, ITO or IZO) to facilitate electrical contact with other parts of the device. The substrate material, however, is not particularly limited, and those of ordinary skill in the art would be capable of selecting an appropriate substrate material based on the intended use or function of the printed ink composition.

As discussed further below, the ink composition may be printed or deposited via additive manufacturing, e.g. 3D printing. As also discussed further below, in some embodiments, the printing or deposition of the ink composition includes the printing or deposition of strands of ink (or "ink strands"), which ink strands are deposited or printed in a manner suitable to impart the desired structure. Aspects of the printed structure of the electrode (including, for example, the arrangement, size, and packing density of the ink strands that form the structure (e.g., the electrode)) may be selected according to the intended electrochemical application, the desired surface area of the electrode, inclusion of flow channels, etc.

The arrangement of the ink strands in the electrode structure is not particularly limited as long as the ink strands are in stable contact with each other (e.g., the ink strands maintain a generally constant set of spatial relationships, and the collection of strands is able to be transported as a single piece). As used herein, the term "generally" is used as a term of approximation, and not as a term of degree, and is intended to account for minor or expected deviations in the value of the relevant parameter that result from the measurement, observation or calculation method used. For example, the term "generally constant" is intended to account for spatial relationships that may not remain perfectly uniform or constant, but that fall within an accepted level of deviation such that those of ordinary skill in the art would still consider the spatial relationships in the structure to be constant. In some embodiments, multiple ink strands may be aligned and adjacent so that a solid two- or three-dimensional mass is formed. In some embodiments, planned discontinuities in or between one or more ink strands may be used to form holes or channels. In some embodiments, a first layer of ink strands may lie along a first direction and be spaced apart from each other, and a second layer of ink strands (above or below the first layer of ink strands) may lie along a second direction and also be spaced apart from each other, thereby forming a 3-dimensional mesh or lattice. The angle between ink strands in adjacent layers is not particularly limited, and may be any suitable angle as long as the resulting structure is stable. In some embodiments, for example, the angle between the ink strands may be about 20° to about 90°, about 30°, about 45°, about 60°, or about 90°. The mesh or lattice may have any suitable number of layers of ink strands, and in some embodiments may include 2 or more layers, 3 or more layers, 4 or more layers, etc. Additionally, while each layer of the mesh or lattice may include generally equal spacing between the ink strands of the layer, in some embodiments, the spacings between different ink strands of the same layer may differ, or the spacings used in one layer may differ from the spacings used in another layer. For example, in some embodiments, the spacings between ink strands within each layer may be generally equal, but the spacings used in one layer may differ from the spacings used in a second or subsequent layer. Additionally, the mesh or lattice may have any stable geometry, and the arrangement of strands may be described in terms of a lattice system. In some embodiments, for example, the ink strands may be printed to have a tetragonal geometry, such as a face-centered tetragonal (FCT) geometry. In some embodiments, the ink strands may be printed to have a cubic geometry.

The size of each individual ink strand is not particularly limited, and may be selected according to the technical specifications of the 3D printing device (e.g., the extrusion diameter of the nozzle) and the viscoelastic properties of the ink. For example, higher ink viscosities may require higher pressures to pass through a smaller extrusion diameter, and the maximum pressure of a device may be limited as described above. In some embodiments, however, the strands may have a diameter of about 25 microns to about 500 microns, for example, about 50 microns to about 400 microns, about 100 microns to about 350 microns, or about 200 microns to about 200 microns. However, embodiments of the present disclosure are not limited thereto.

The packing density, which may also be expressed as strand separation distance or number of strands per inch, may be selected according to the technical specifications of the 3D printing device (e.g., the maximum printing resolution of the device) and the desired performance characteristics of the intended electrochemical device. For example, a higher packing density may increase the effective surface area and electrocatalyst loading of the electrode, but may also result in decreased mass transport to certain internal regions of the electrode. In some embodiments, for example, parallel strands may be spaced at a distance of about 0.5 micron to about 5 micron, for example, about 0.75 micron to about 4 micron, about 1 micron to about 3 micron, etc.

The ink flow rate is also not particularly limited, but in some embodiments, may be matched to the build platform print (translation) speed in order to maintain consistency in the diameter of the printed ink strands. In some embodiments, for example, the ink flow rate and print speed may be about 1 mm/s to about 100 mm/s, for example, about 5 mm/s to about 70 mm/s, or about 10 mm/s to about 50 mm/s.

Figure 1B:
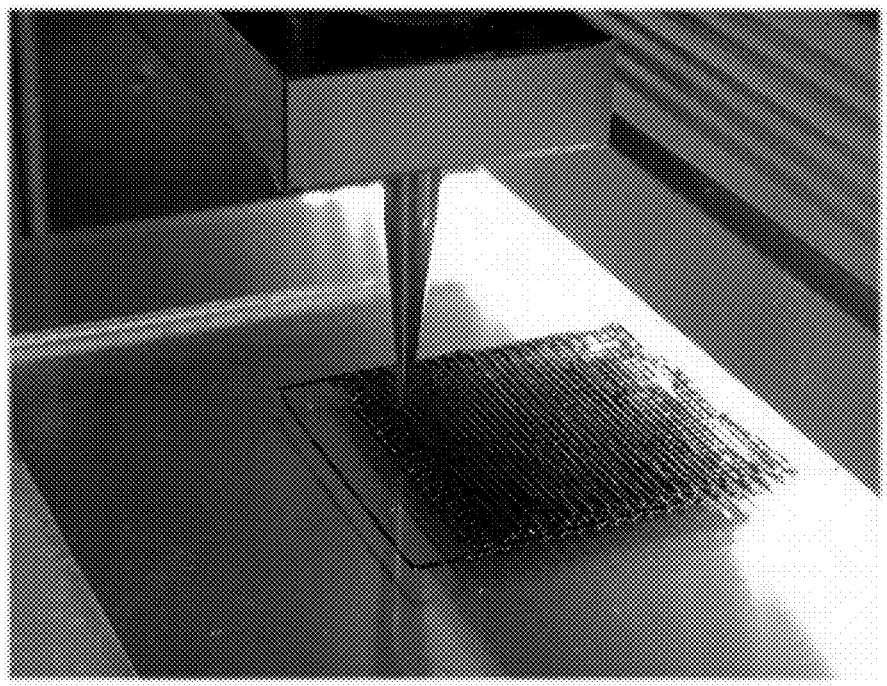
FIG. 1B is a photographic image showing 3D printing of an electrochemically active ink composition to produce a mesh-format electrode, according to embodiments of the present disclosure.

FIG. 1A is a flowchart and schematic diagram that illustrates the preparation of an example ink composition and an electrode printed using the ink composition according to embodiments of the present disclosure. As discussed herein, a method of preparing an ink composition according to embodiments of the present disclosure includes a first act 10 of mixing a carbon source 12, a dopant source 14, and a metal-containing catalyst 16 to form a mixed powdered precursor 22 (also referred to herein as "a composite material"). The act of mixing 10 may be accomplished by any suitable means, for example, by mechanical grinding or milling. In a second act 20, the mixed powdered precursor 22 is mixed with a polymer matrix 24 (also referred to herein simply as a "polymer") to yield a 3D-printable ink composition 26. In a third act 30, the 3D-printable ink composition 26 is placed in a syringe (or any other suitable delivery device) and extruded (or otherwise deposited) on a substrate 32 in any suitable shape (for example, in the shape of a mesh to thereby form an electrode 34. FIG. 1B is a photographic image showing 3D printing of an electrochemically active ink composition to produce a mesh-format electrode, according to embodiments of the present disclosure.

The printed ink strands may be subjected to a curing process in order to induce polymerization of the polymer matrix and mechanical stiffening of the printed electrode. In some embodiments, the curing may be achieved by heating (e.g., exposing the printed structure to heat). The heating temperature may be any suitable temperature, for example, a temperature higher than the ambient temperature of printing (e.g., higher than room temperature or 25° C.) and lower than the temperature at which the components of the ink may begin to degrade. In some embodiments, curing may be achieved or supported by drying (removal of solvent) under a vacuum atmosphere, for example, a vacuum of less than about 150 Torr, less than about 75 Torr, less than about 1.5 Torr, less than about $10^{-3}$ Torr, or less than about $10^{-5}$ Torr. Such vacuum drying may be carried out at ambient temperatures, or under heating conditions as described above. In some embodiments, for example when one or more polymerization reactions are ultraviolet (UV)-activated or involve free-radical polymerization reactions, the curing may be achieved by exposure to UV.

In some embodiments, curing may occur after printing of all ink strands is completed, and the curing conditions may be maintained at least until the mechanical stiffness of the strands has increased to a desired level or achieves a steady state. In some embodiments, curing may occur after the deposition of each layer in order to solidify or partially solidify each layer before the addition of a subsequent layer.

In some embodiments, after printing and curing, the electrode may be further subjected to pyrolysis (or annealing). The pyrolysis or annealing may induce further chemical changes in the ink composition. In some embodiments, the polymer matrix may be converted to a conductive carbon material or chain. In some embodiments, for example, the pyrolysis or annealing may induce degradation of the pore-forming material and the formation of pores, as discussed above. In some embodiments, the pyrolysis or annealing may induce rearrangement, oxidation, reduction, etc. of the dopant source/atoms and/or catalyst to thereby produce moieties with increased electrocatalytic activity compared to the unpyrolyzed (or un-annealed) electrode. The pyrolysis or annealing temperature is not particularly limited. In some embodiments, for example, the printed and cured electrode may be pyrolyzed (or annealed) at a temperature of about 500° C. to about 1000° C., or about 700° C. to about 900° C.

In some embodiments, the pyrolysis or annealing may be carried out in the presence of a reactive gas, i.e., a gas that can react with certain components of the ink composition to thereby deposit a dopant. One non-limiting example of such a reactive gas is ammonia. In some embodiments, however, the pyrolysis or annealing may be carried out in the presence of an inert gas. Any suitable inert gas may be used, non-limiting examples of which include $N_2$ and argon (Ar).

While some embodiments of the present disclosure involve pyrolysis or annealing of the printed ink composition (or printed ink strands), it is understood that pyrolysis or annealing is not always necessary. Indeed, in some embodiments, the electrode is not subjected to pyrolysis or annealing before use. For example, the electrode may not be pyrolyzed or annealed when the electrode is printed on a substrate that is incompatible with pyrolysis (such as on a proton exchange membrane), and/or when the electrode includes a material that is already electrochemically active without pyrolysis.

In some embodiments, the material used to form the 3D printed electrode may have a surface area similar to that of the carbon source, even after curing and annealing. For example, the 3D printed electrode may have a surface area of about 50 m$^2$/g to about 1,600 m$^2$/g, about 200 m$^2$/g to about 1,200 m$^2$/g, or about 400 m$^2$/g to about 800 m$^2$/g, and in some embodiments, about 50 m$^2$/g to about 300 m$^2$/g, about 100 m$^2$/g to about 250 m$^2$/g, about 150 m$^2$/g to about 250 m$^2$/g. In some embodiments, when a pore-forming material is included in the electroactive ink composition, the surface area of the 3D printed electrode may be further increased. Those having ordinary skill in the art are capable of determining a suitable amount of pore-forming material for attaining the desired surface area.

In some embodiments, a method of preparing an electrode (e.g., a printed electrode) includes mixing the powdered precursor and the polymer matrix to form the ink composition described herein, depositing the ink composition on a substrate, and curing the ink composition on the substrate. In some embodiments, the method may further include pyrolyzing the cured ink composition on the substrate. The ink composition and substrate may be the same as described herein. Further, according to some embodiments, depositing the ink composition may be accomplished by introducing the ink composition to a 3D printer, and using the 3D printer to deposit (or print) the ink composition onto the substrate, e.g., in the form of a plurality of interconnected ink strands (as discussed further above). The plurality of ink strands may then be cured to form the printed electrode. Additionally, 3D printing, curing the ink composition on the substrate, and pyrolyzing (or annealing) the cured ink composition (i.e., the printed electrode structure) may be achieved using the strategies and conditions described herein.

In some embodiments, for example when the ink composition further includes a pore-forming material as discussed above, the act of mixing the powdered precursor and the polymer matrix may further include mixing (e.g., the powdered precursor or the ink composition) with a pore-forming material selected from a salt, a sugar, urea, a urea derivative, and combinations thereof. In some embodiments, the method may further include removing the pore-forming material from the printed electrode after curing, using any suitable method as described herein for various pore-forming materials. In some embodiments, for example when the pore-forming material is a polar material such as a sugar or salt, the act of removing the pore-forming material from the printed electrode may include dissolving the pore-forming material in water.

In some embodiments, a method of catalyzing a reaction includes applying a voltage to an electrode assembly. The electrode assembly may include the electrode described herein (e.g., as a working electrode), a counter electrode and an electrolyte, and the voltage may be applied across the electrode and the counter electrode. The electrode assembly may further include a reference electrode. The electrode, counter electrode, and optional reference electrode are submerged in (or otherwise in contact with) the electrolyte so that the electrode, counter electrode and optional reference electrode are in electrical contact with each other (through the electrolyte). The electrode may be the same as described herein, and in some embodiments, may be active for the ORR. The reference electrode may be any suitable reference electrode, and those of ordinary skill in the art would be capable of selecting an appropriate reference electrode based on the selected electrode and intended application. The counter electrode is also not particularly limited. In some embodiments, however, the counter electrode may include any conductive material having suitable characteristics (e.g., a high surface area). Non-limiting examples of suitable counter electrodes include graphite, glassy carbon, and Pt.

In some embodiments, the electrolyte may include one or more reactants dissolved in the electrolyte, and the counter electrode may be electrocatalytically active for a second reaction that can be paired with the reaction at the electrode to be chemically balanced and thermodynamically spontaneous (e.g., have a total E larger than 0 V). In some embodiments, for example, the reaction at the electrode may be the ORR, and the second reaction at the counter electrode may be the HER. Further, the electrode and the counter electrode may be physically separated by a membrane or salt bridge, and electrically connected via an external circuit. The membrane or salt bridge may be capable of conducting ions such as protons and/or hydroxide ions. In some embodiments, the method may further include heating the electrode assembly to a temperature at which the reaction at the electrode and the second reaction at the counter electrode are both spontaneous. For example, the electrode assembly may be heated to a temperature of about 200° C. to about 900° C., or about 400° C. to about 700° C., etc.

According to aspects of embodiments of the present disclosure, a fuel cell includes a membrane electrode assembly including the electrode disclosed herein, a membrane on the electrode, and a counter electrode on the membrane. The electrode may be the same as described herein. The counter electrode may be any suitable counter electrode as long as it is electrochemically active for a reaction that can be paired with the reaction at the electrode to be chemically balanced and thermodynamically spontaneous. In some embodiments, the electrode may be a cathode active for the ORR and the counter electrode may be an anode active for the HER. The electrode and the counter electrode may be stacked (or otherwise arranged) and physically separated by the membrane, and may be electrically connected via an external circuit. The membrane may be capable of conducting ions such as protons and/or hydroxide ions. The membrane assembly may be flooded with an electrolyte solution that is capable of conducting charges and solubilizing the reactant gases and fuel. The compartment of the fuel cell including the electrode (cathode) may be supplied with an oxidant (e.g., oxygen gas), and the compartment of the fuel cell including the counter electrode (anode) may be supplied with fuel (e.g., hydrogen gas). In some embodiments, the method may further include heating the fuel cell to a temperature at which the reaction at the electrode (cathode) and the second reaction at the counter electrode (anode) are both spontaneous. For example, the fuel cell may be heated to a temperature as described above.

Figure 2:
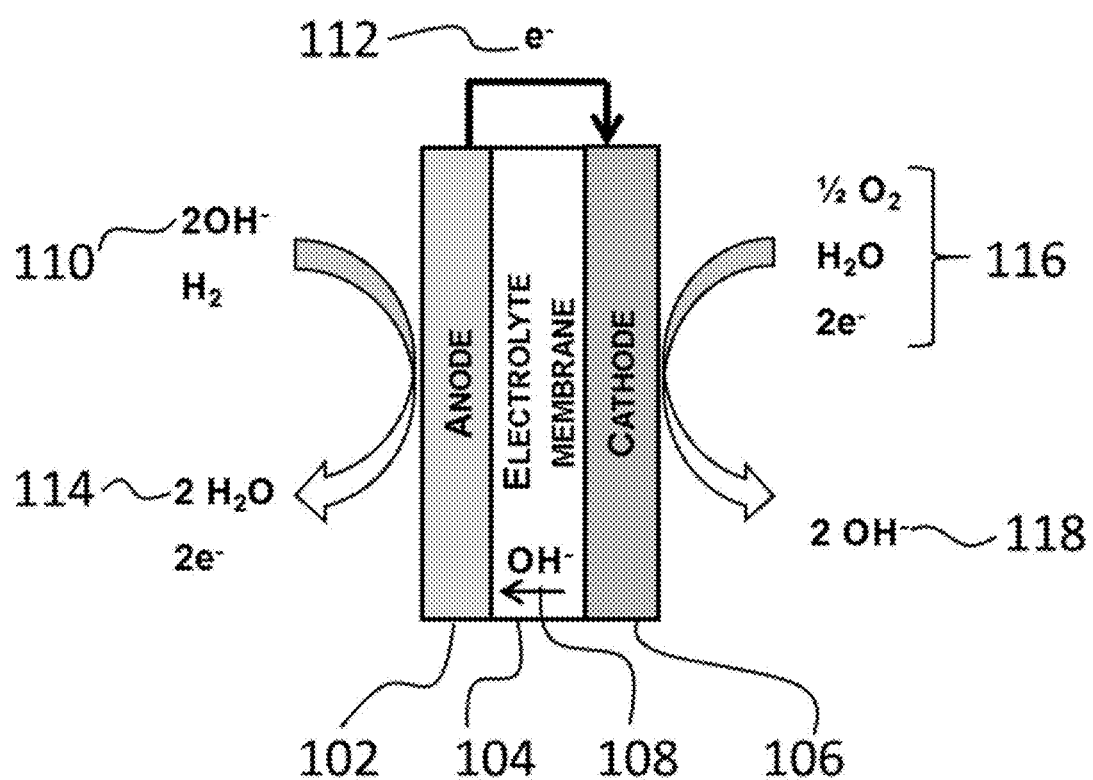
FIG. 2 is a schematic diagram of an example fuel cell including a 3D printed electrode formed from an electroactive ink composition according to embodiments of the present disclosure.

FIG. 2 is a schematic diagram of an example fuel cell 100 including a 3D printed electrode formed from an electroactive ink composition according to embodiments of the present disclosure. Although an alkaline fuel cell is illustrated as an example, those having ordinary skill in the art are capable of applying the structure and configuration to additional types of fuel cells (e.g., fuel cells in acidic media, for example proton exchange membrane fuel cells) according to the principles described herein. As such, the present disclosure is not limited to application in alkaline fuel cells, and may be applied to other fuel cells, as would be recognized and achievable by those of ordinary skill in the art. The fuel cell 100 includes an anode 102, an electrolyte membrane 104, and a cathode 106, which are sandwiched together and impregnated with an electrolyte 108 (shown herein as including hydroxide). A fuel 110 (shown herein as H$_2$) is supplied to the anode, for example, in a flow configuration, and electrons 112 and water 114 are generated by oxidation of the fuel 110. The electrons 112 are transferred to an external load and then to the cathode 106, where they react with cathode reactants 116 (including O$_2$ and H$_2$O) to thereby produce hydroxide 118 and complete the overall electrochemical reaction. One or more of the anode 102 and the cathode 106 include a 3D printed electrode formed by printing the electroactive ink composition according to embodiments of the present disclosure.

The following examples and experimental data are provided for illustrative purposes only, and do not limit the scope of the embodiments of the present disclosure.

EXAMPLES

Example 1 (N—C—Fe)

An ink composition was prepared by ball milling XC-72 carbon (obtained from Cabot Corp., Boston, Mass.) as a carbon source, urea (obtained from Fisher scientific, Waltham, Mass.) as a nitrogen precursor, and FeCl$_3$ (obtained from Sigma Aldrich, St. Louis, Mo.) as an iron precursor at a 1:1:0.01 molar ratio. The mix was then incorporated in a polyurethane resin (CONATHANE® obtained from Cytec Industries Inc., Woodland Park, N.J.) as the polymer matrix, using a vacuum planetary centrifugal mixer (manufactured by Thinky USA, Laguna Hills, Calif.) for 2 minutes at 2000 rpm, under a maximum vacuum of 0.2 Torr. The resulting product was placed in a 20 mL disposable syringe to be used in a 3D printer (System 30M manufactured by Hyrel 3D, Norcross, Ga.).

A 3×3 cm$^2$ electrode including 7 layers was 3D printed on a glass plate substrate in a face-centered tetragonal (FCT) configuration using a 250 μm micronozzle. A pressurizing dispenser system (Ultimus™ V Model High Precision Dispenser obtained from Nordson Corp., Westlake, Ohio) was attached to the syringe barrel and used at a pressure of 10 to 100 psi. The print speed and ink volumetric flow rate were matched at 5 to 50 mm/s. The electrode was subsequently cured by heating in ambient air at a temperature between 25° C. and 250° C. for about 1 hour to about 24 hours, depending on the polymer.

Example 2 (N—C—Pt)

An ink composition was prepared as in Example 1, except that the FeCl$_3$ iron precursor was replaced with Pt metal. The resulting ink was printed and cured as described above in connection with Example 1.

Example 3 (N—C)

An ink composition was prepared as in Example 1, except that the FeCl$_3$ iron precursor was omitted. The resulting ink was printed and cured as described above in connection with Example 1.

Comparative Example 1 (Carbon Only)

An ink composition was prepared as in Example 1, except that the nitrogen source and the FeCl$_3$ iron precursor were omitted. That is, the ink included a carbon source dispersed in a polymer matrix. The resulting ink was printed and cured as described above in connection with Example 1.

Rheological Characterization of the Ink Compositions

Rheological measurements of the ink compositions according to Examples 1-3 and Comparative Example 1 were carried out on a rheometer (Discovery Hybrid Rheometer-2 manufactured by TA Instruments, New Castle, Del.) using a parallel plate fixture with a diameter of 25 mm. Frequency sweeps were performed in a frequency range of about 0.01 rad/s to about 600 rad/s at a fixed strain of 0.1% at 25° C. The tests were conducted in the linear viscoelastic region as confirmed from an independent strain sweep test. The strain sweep and the stress sweep were performed in a strain range of about 0.1% to about 10,000% and a stress range of about 10 Pa to about 1,000 Pa, respectively, at a fixed angular frequency of 2 rad/s for each measurement.

Physical Characterization of the Printed Electrodes

X-ray Diffraction (XRD) spectra were obtained using a Siemens D5000 diffractometer with CuKα radiation (1.5418 Å) and a graphite diffracted beam monochromator. The XRD spectra were analyzed using JADE XRD analysis software (obtained from Materials Data Inc., Livermore, Calif.). All measurements were collected at 25° C. The structure and the morphology were studied using electron microscopy. Scanning electron microscopy (SEM) images were obtained at 10 kV with a FEI Quanta 400 ESEM (manufactured by Hillsboro, Oreg.). Surface areas were determined using Brunauer-Emmett-Teller (BET) analysis obtained using a Quantachrome autosorb iQ.

Electrochemical Characterization of the Printed Electrodes

The activity and selectivity of the 3D-printed catalyst-containing electrodes towards the oxygen reduction reaction (ORR) were measured using rotating ring-disc electrode (RRDE) techniques. Measurements were obtained in a conventional three-electrode cell at a rotation speed of 900 rpm at 25° C. using a VMP3 potentiostat (manufactured by Bio-Logic Science Instruments, Seyssinet-Pariset, France). A graphite rod was used as a counter electrode, an Hg/HgO (1.0 M KOH, 0.880 V vs. RHE) or Ag/AgCl (0.230 V vs. RHE) electrode was used as a reference electrode, and a glassy carbon-Pt ring-disk electrode was used as the working electrode. The ink loading on the disk portion of the RRDE working electrode was adjusted and standardized to 0.6 mg cm$^{-2}$ (e.g., 0.6 mg of the ink composition per cm$^2$ of disk surface area). The voltages herein are reported versus RHE (reversible hydrogen electrode). ORR steady-state polarization curves were recorded in O$_2$-saturated 0.1 M NaOH or 0.5 M H$_2$SO$_4$ electrolytes with a 30 mV per 30 seconds potential step. Background scans were recorded in N$_2$-saturated electrolyte under identical conditions and subtracted from the experimental scans.

The electron transfer number (n) per O$_2$ molecule involved in the ORR was measured by holding the platinum ring at a constant potential of 1.3 V vs. RHE. n was calculated according to Equation 1:

$$n = \frac{4I_d}{I_d + I_r/N}. \qquad \text{Equation 1}$$

The peroxide (H$_2$O$_2$) yield of the electrode upon reduction of O$_2$ was calculated according to Equation 2:

$$\%H_2O_2 = \frac{2I_r/N}{I_d + I_r/N} \times 100\%. \qquad \text{Equation 2}$$

In Equations 1 and 2, $I_d$ and $I_r$ are the disk and ring currents, respectively, and N is the collection efficiency of the working electrode.

Figure 3:
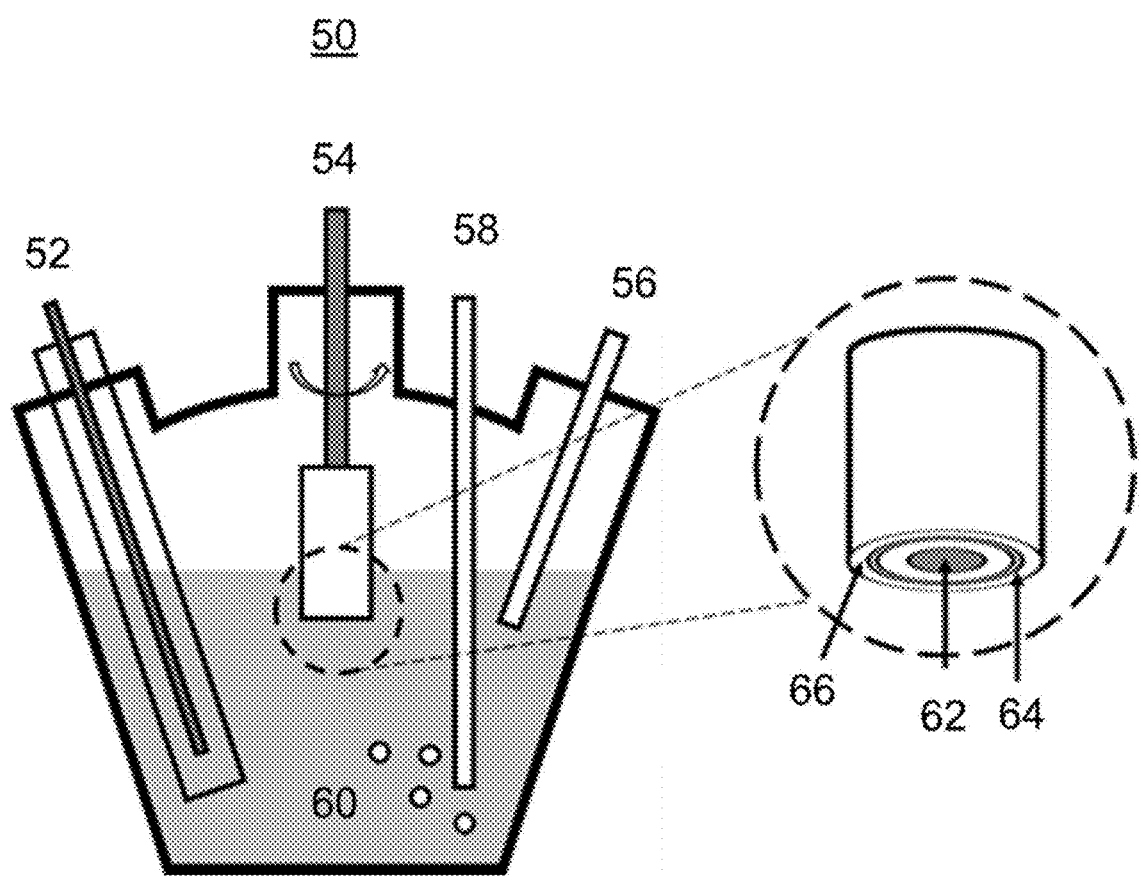
FIG. 3 is a schematic diagram showing the setup of a three-electrode electrochemical cell used to test the performance of the electrodes according to embodiments of the present disclosure, including a counter electrode, a rotating ring disk electrode (RRDE) as a working electrode, a reference electrode in three separate flask necks, and a gas inlet used for saturating the electrolyte with the appropriate gas content.

FIG. 3 is a schematic diagram showing the setup of the three-electrode electrochemical cell 50, including a counter electrode 52, RRDE working electrode 54, and reference electrode 56 in three separate flask necks, and a gas inlet 58 used for saturating the electrolyte 60 with the appropriate gas content. The inset shows the arrangement of the disk 62 and ring portions 64 of the RRDE working electrode 54, which are embedded in a chemically inert insulator 66 and controlled and measured independently of each other.

Figure 4:
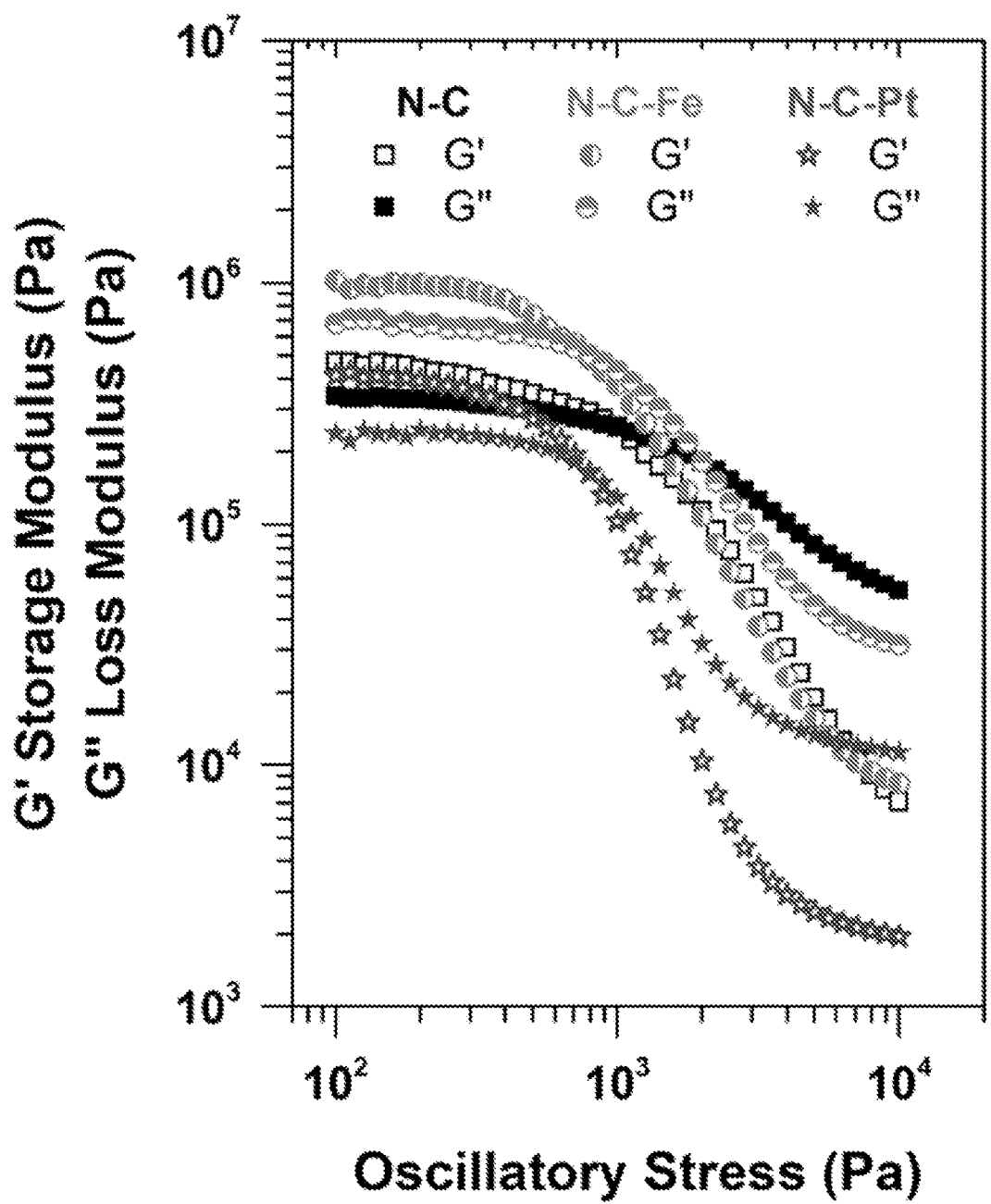
FIG. 4 is a plot showing the change in G' (storage modulus) and G" (loss modulus) over an oscillatory stress range of about $10^2$ to about $10^4$ Pa for the ink compositions according to Example 1 (semi-filled circles), Example 2 (stars), and Example 3 (squares).

The viscoelastic properties of the ink compositions according to Examples 1-3 were measured according to the described procedure. FIG. 4 is a graph showing the change in G' (storage modulus) and G" (loss modulus) over an oscillatory stress range of about $10^2$ to about $10^4$ Pa for the ink compositions according to Example 1 (semi-filled circles), Example 2 (stars), and Example 3 (squares). The crossover point (where G'=G") indicates the desirable print nozzle pressure for each ink composition, and was found to be similar for all Examples (e.g., close to about $10^3$ Pa).

Figure 5A:
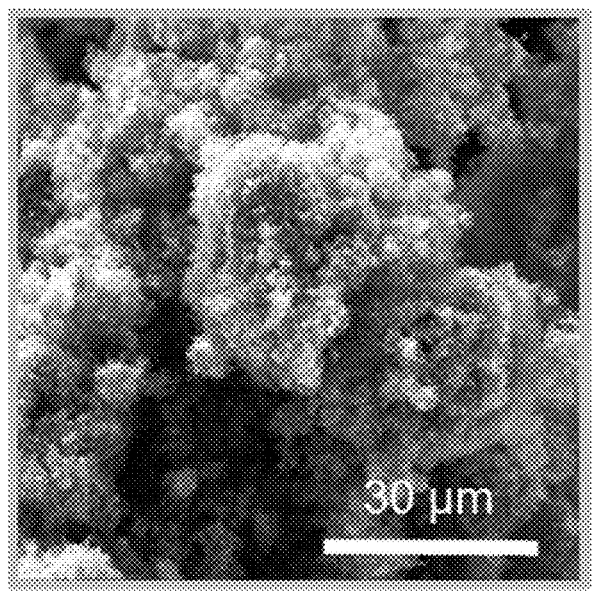
FIG. 5A is a scanning electron microscopy (SEM) image of the as-received carbon source (XC-72) used in the Examples and Comparative Example.
Figure 5B:
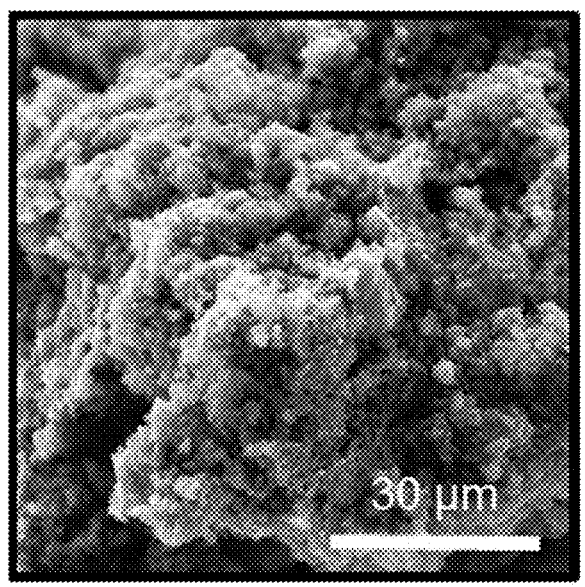
FIG. 5B is a SEM image of the ink according to Example 3 (N—C).
Figure 5C:
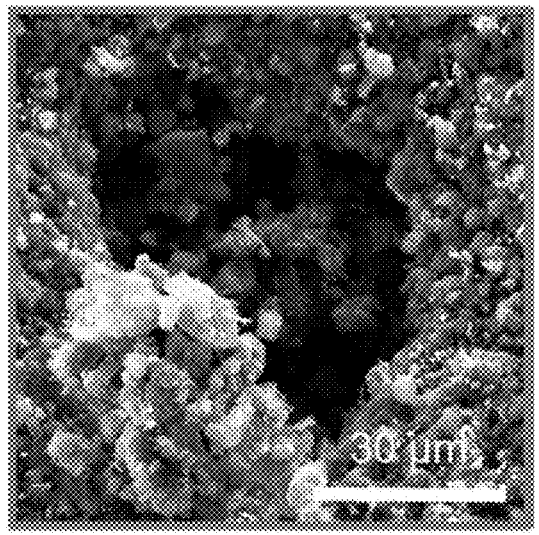
FIG. 5C is a SEM image of the ink according to Example 1 (N—C—Fe).
Figure 5D:
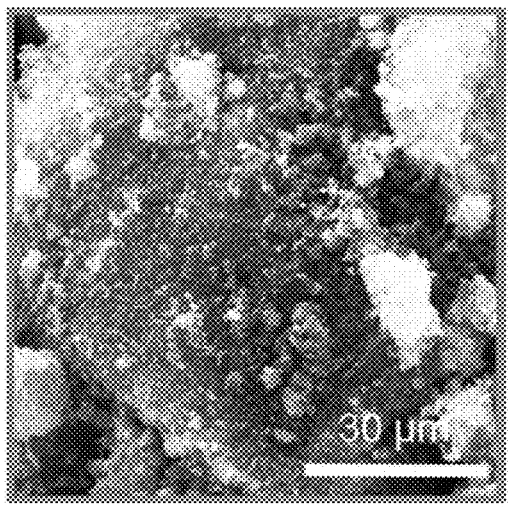
FIG. 5D is a SEM image of the ink according to Example 2 (N—C—Pt) showing the same magnification as in FIGS. 5A-5C.
Figure 5E:
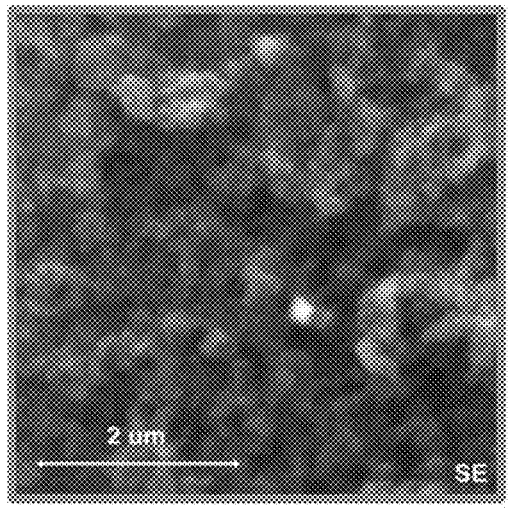
FIG. 5E is a SEM image of the ink according to Example 2 (N—C—Pt) showing a higher magnification view (compared to FIG. 5D) using secondary electron (SE) imaging.

The morphological properties of the ink compositions according to Examples 1-3 after curing were studied using SEM. FIG. 5A is a SEM image of the as-received carbon source (XC-72). FIG. 5B is a SEM image of the ink according to Example 3 (N—C). FIGS. 5A and 5B show that the morphology of the carbon appears relatively unchanged by the addition of the nitrogen source (dopant). FIG. 5C is a SEM image of the ink according to Example 1 (N—C—Fe). Here, the overall morphology (particle size and shape) of the carbon appears unchanged compared to FIG. 5A, but particles having a diameter of about 5 microns appear to be deposited on the surface of the carbon, corresponding to the Fe source. FIG. 5D is a SEM image of the ink according to Example 2 (N—C—Pt) showing the same magnification as FIGS. 5A-5C, and FIG. 5E is SEM image of the same ink at a higher magnification view (compared to FIG. 5D) using secondary electron (SE) imaging. Here, particles having a diameter of about 20-50 nm appear to be deposited on the surface of the carbon, corresponding to the Pt catalyst.

Figure 6A:
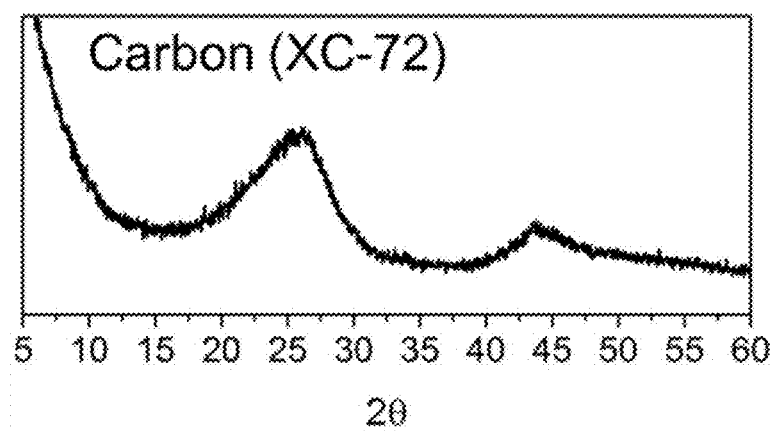
FIG. 6A is an X-ray Diffraction (XRD) spectrum of the as-received carbon source (XC-72) used in the Examples and Comparative Example.
Figure 6B:
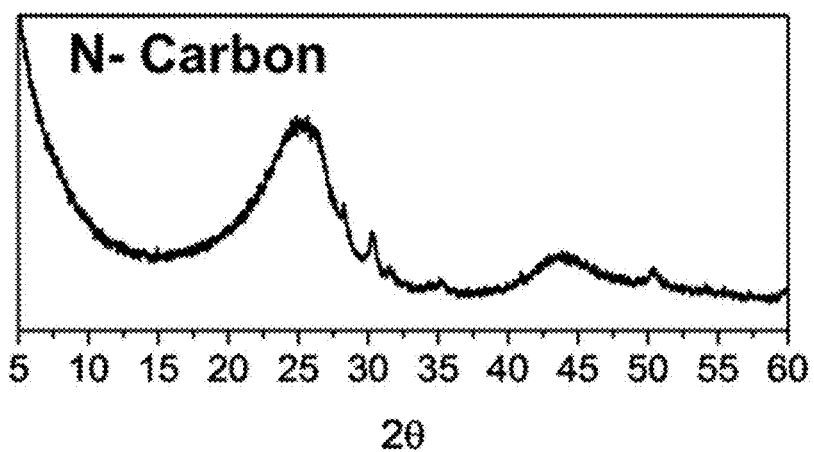
FIG. 6B is a XRD spectrum of the ink according to Example 3 (N—C).
Figure 6C:
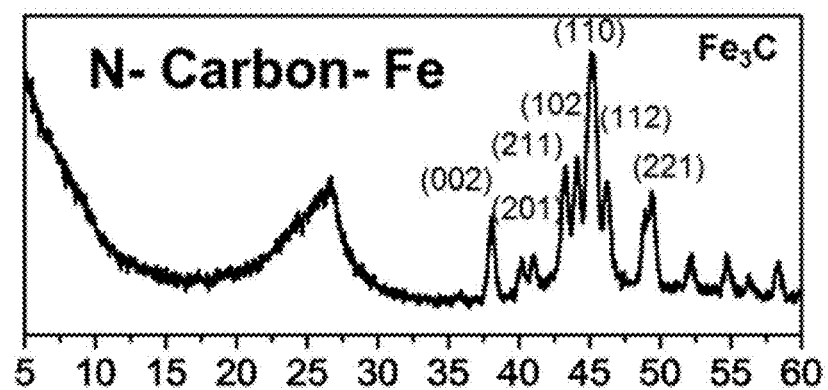
FIG. 6C is a XRD spectrum of the ink according to Example 1 (N—C—Fe).
Figure 6D:
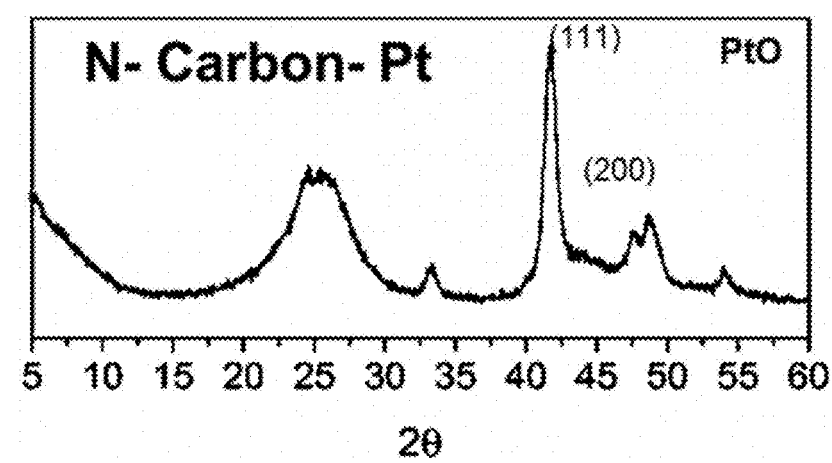
FIG. 6D is a XRD spectrum of the ink according to Example 2 (N—C—Pt).

The crystallographic and phase properties of the ink compositions according to Examples 1-3 after curing were studied using XRD within a 2θ range of 5° to 60°. FIG. 6A is an XRD spectrum of the as-received carbon source (XC-72). FIG. 6B is a XRD spectrum of the ink according to Example 3 (N—C). The small peaks at about 38°, 32°, and 51° are attributed to the nitrogen dopant. FIG. 6C is a XRD spectrum of the ink according to Example 1 (N—C—Fe). Here, the indexed and labeled peaks are attributed to $Fe_3C$ crystals produced by reaction between the Fe source and the carbon source during pyrolysis of the electrode. FIG. 6D is a XRD spectrum of the ink according to Example 2 (N—C—Pt). Here, the indexed and labeled peaks are attributed to PtO crystals produced during pyrolysis (e.g., in air) of the electrode.

Figure 7:
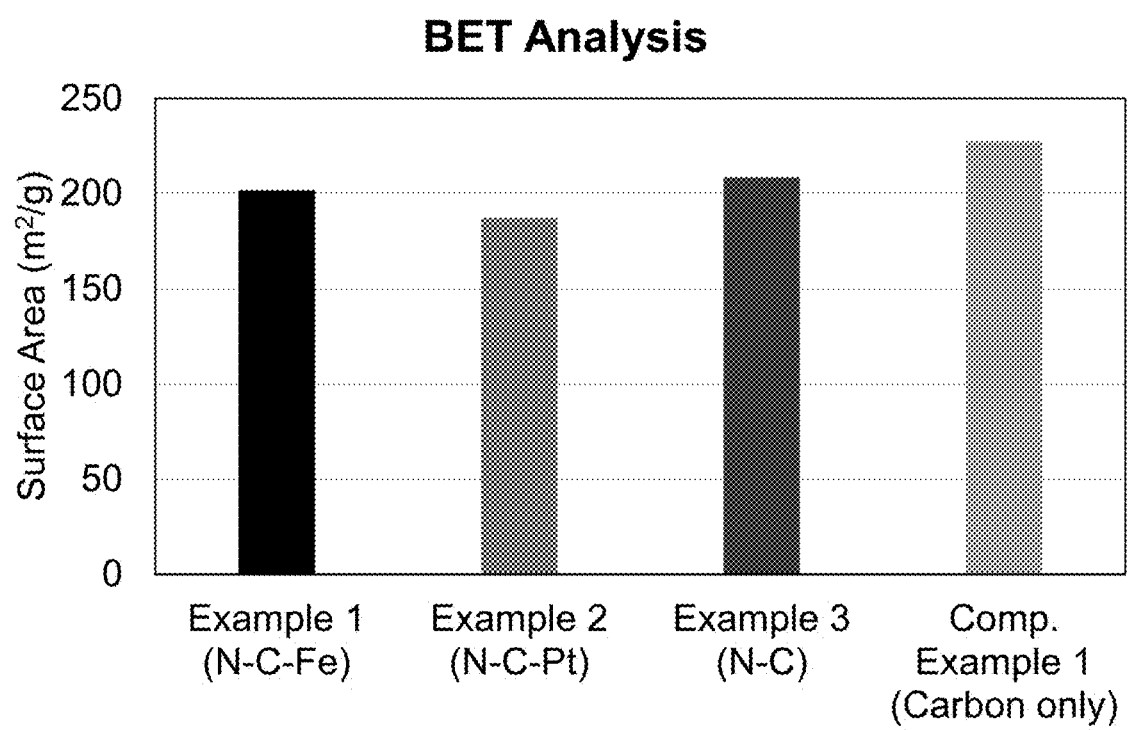
FIG. 7 is a graph comparing the measured Brunauer-Emmett-Teller (BET) surface areas of Examples 1-3 and Comparative Example 1.

The BET surface areas of the compositions according to Examples 1-3 and Comparative Example 1 after curing and crushing into a powder were quantified and compared, as shown in the graph of FIG. 7. As shown in FIG. 7, the surface area of the electrode was only slightly decreased when the ink composition included a nitrogen dopant, Fe catalyst, and/or Pt catalyst, compared to the carbon-only control of Comparative Example 1. For example, the biggest decrease in surface area, compared to Comparative Example 1, was about 18% for Example 2.

Figure 8A:
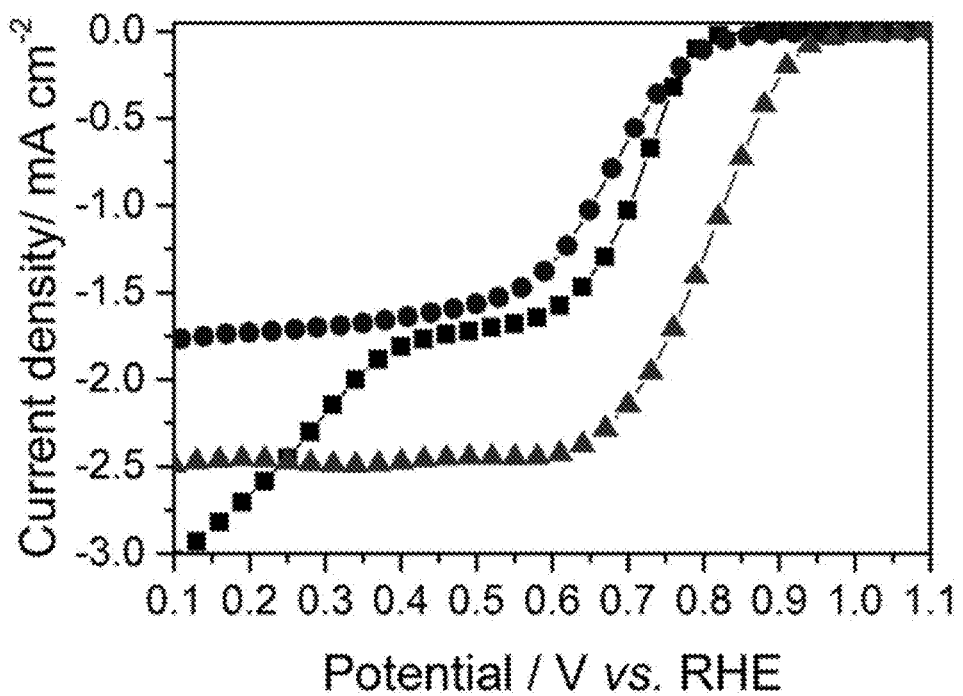
FIG. 8A is a plot comparing the disk electrode I-V curves for the electrodes according to Comparative Example 1 (carbon only, squares), Example 1 (N—C—Fe, triangles), and Example 3 (N—C, circles) under alkaline conditions.

The electrocatalytic performance of the electrodes produced from the ink compositions according to Examples 1 and 2 and Comparative Example 1 were also studied by RRDE. FIG. 8A is a plot comparing the disk electrode I-V curves for the electrodes according to Comparative Example 1 (carbon only, squares), Example 1 (N—C—Fe, triangles), and Example 3 (N—C, circles) under alkaline conditions (0.1 M NaOH). The I-V curves show an improvement in limiting current density and voltage (as determined by the onset voltage or the half wave voltage) as additional elements are added to the ink.

Figure 8B:
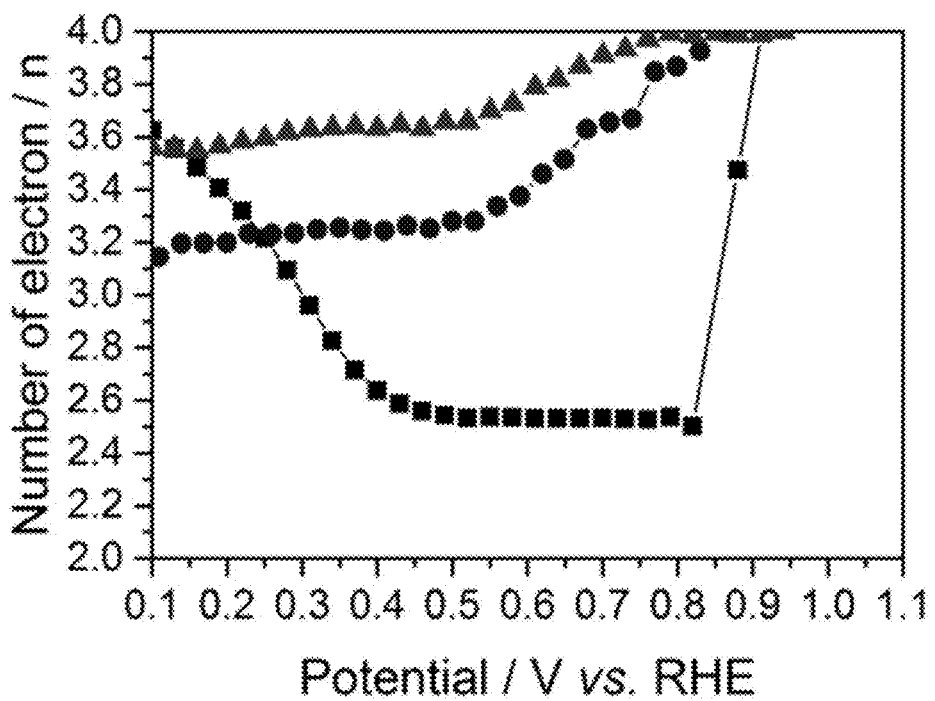
FIG. 8B is a plot showing the average number of electrons (n) being transferred to each molecule of $O_2$ at a given disk electrode voltage for each of the electrodes in FIG. 8A (alkaline conditions).

FIG. 8B is a plot showing the average number of electrons (n) being transferred to each molecule of $O_2$ at a given disk electrode voltage for each of the samples in FIG. 8A (alkaline conditions). The complete reduction of $O_2$ to $H_2O$ requires 4 electrons, while the incomplete reduction of $O_2$ to $H_2O_2$ requires 2 electrons, as described in the second row of Table 1. Reduction to $H_2O$ is more efficient because it is associated with transferring a higher number of electrons, and therefore yields a higher current density for the same amount of reactants. As such, an (n) closer to 4 is associated with a higher efficiency. FIG. 8B shows that n=2.5 for the electrode according to Comparative Example 1 (carbon only, squares), n=3.2 for the electrode according to Example 3 (N—C), and n=3.6 for the electrode according to Example 1 (N—C—Fe). As such, the selectivity of the electrode for the 4-electron reduction over the incomplete 2-electron reduction also increases as additional elements (e.g., catalysts) are added to the ink.

Figure 9A:
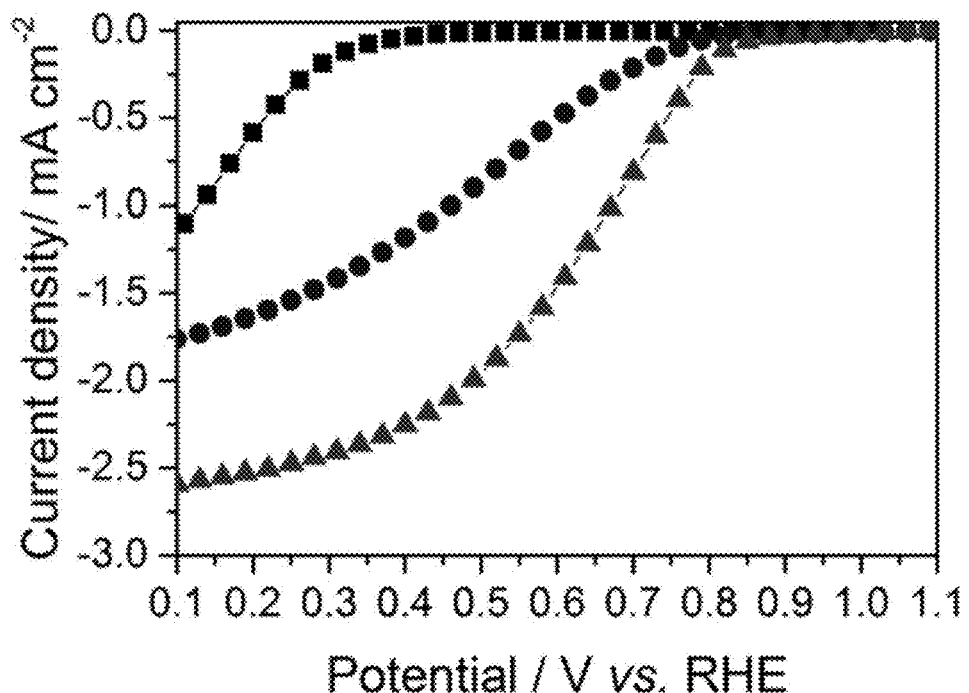
FIG. 9A is a plot comparing the disk electrode I-V curves for the electrodes according to Comparative Example 1 (carbon only, squares), Example 1 (N—C—Fe, triangles), and Example 3 (N—C, circles) under acidic conditions.

FIG. 9A is a plot showing the disk electrode I-V curves for the electrodes according to Comparative Example 1 (carbon only, squares), Example 1 (N—C—Fe, triangles), and Example 3 (N—C, circles) under acidic conditions (0.5 M $H_2SO_4$). The I-V curves again show an improvement in limiting current density and voltage (as determined by the onset voltage or the half wave voltage) as additional elements are added to the ink.

Figure 9B:
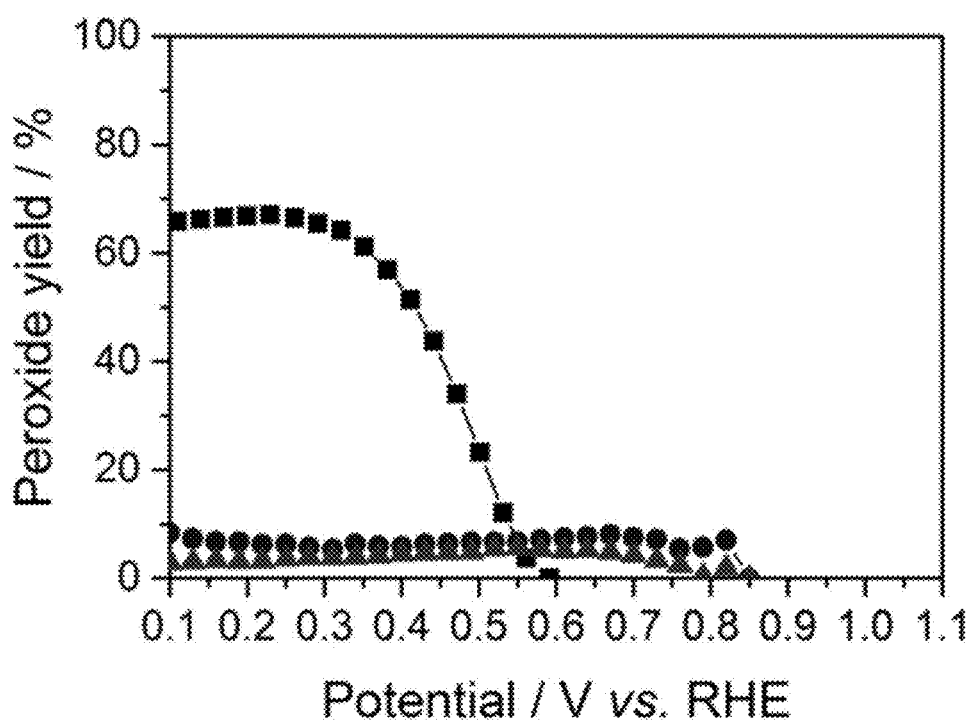
FIG. 9B is a plot showing the peroxide yield at a given disk electrode voltage for each of the electrodes in FIG. 9A (acidic conditions).

FIG. 9B is a plot showing the peroxide yield at a given disk electrode voltage for each of the samples in FIG. 9A (acidic conditions). While the carbon electrode according to Comparative Example 1 produces up to 60% peroxide at lower voltages, the electrodes according to Examples 1 and 3 appear to produce only about 5-6% peroxide at all tested voltages, and therefore show a marked improvement in efficiency.

Accordingly, the 3D-printed electrodes produced using ink compositions according to embodiments of the present disclosure were found to be effective for the ORR. Furthermore, the ink compositions, electrodes, and production methods according to embodiments of the present disclosure were shown to enable the development of specially designed and tuned electrodes for electrochemical applications.

While certain exemplary embodiments of the present disclosure have been illustrated and described, those of ordinary skill in the art will recognize that various changes and modifications can be made to the described embodiments without departing from the spirit and scope of the present invention, and equivalents thereof, as defined in the claims that follow this description. For example, although certain components may have been described in the singular, i.e., "an" electrode, "a" carbon source, and the like, one or more of these components in any combination can be used according to the present disclosure.

Also, although certain embodiments have been described as "comprising" or "including" the specified components, embodiments "consisting essentially of" or "consisting of" the listed components are also within the scope of this disclosure. For example, while embodiments of the present invention are described as comprising a carbon source and a dopant source, embodiments consisting essentially of or consisting of these items are also within the scope of this disclosure. Accordingly, an ink composition may consist of a carbon source and a dopant source, or may consist essentially of a carbon source and a dopant source. In this context, "consisting essentially of" means that any additional components will not materially affect the properties of the ink composition or the resulting printed ink or electrode structure.

As used herein, unless otherwise expressly specified, all numbers such as those expressing values, ranges, amounts or percentages may be read as if prefaced by the word "about", even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe "a" catalyst or "a" carbon source, a mixture of such catalysts or carbon sources can be used. When ranges are given, any endpoints of those ranges and/or numbers within those ranges can be combined within the scope of the present disclosure. The terms "including" and like terms mean "including but not limited to", unless specified to the contrary.

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:

1. An electrochemically active ink composition comprising:
    a homogeneous mixture of:
        a powdered precursor comprising a carbon source powder and a dopant source powder; and
        a liquid polymer matrix that is different from the carbon source and the dopant source.
2. The ink composition of claim 1, wherein the powdered precursor further comprises a metal-containing catalyst.
3. The ink composition of claim 2, wherein the metal-containing catalyst comprises an iron (Fe) compound.
4. The ink composition of claim 3, wherein the iron (Fe) compound comprises $FeCl_3$.
5. The ink composition of claim 2, wherein the metal-containing catalyst comprises a platinum group metal compound.
6. The ink composition of claim 1, wherein the dopant source powder comprises nitrogen (N), fluorine (F), boron (B), phosphorus (P), and/or sulfur (S) atoms.
7. The ink composition of claim 1, wherein the liquid polymer matrix comprises polyurethane, polydimethylsilane (PDMS), polyacrylonitrile (PAN), tetrafluoroethylene-perfluoro-3,6-dioxa-4-methyl-7-octenesulfonic acid copolymer) poly(ethylene oxide) (PEO), low molecular weight polyester, low molecular weight polyethylene, polyimide, polyetheretherketone (PEEK), polysulfone (PSU), polyethersulfone (PESU), polyarylene ether (PAE), polybenzimidazole, poly(4-vinylpyridine), poly(2-vinylpyridine), polyvinylidene difluoride (PVDF), polytetrafluoroethylene (PTFE), tertiary alkylaminated polyaromatic polymers, or a mixture thereof.
8. The ink composition of claim 1, wherein the powdered precursor further comprises a pore-forming material selected from a salt, a sugar, urea, a urea derivative, and combinations thereof.
9. The ink composition of claim 1, wherein the ink composition after curing has a surface area of 50 $m^2$/g to 1,600 $m^2$/g.
10. A 3D printed electrode comprising a substrate and a plurality of cured ink strands on the substrate, wherein the plurality of cured ink strands comprise the ink composition of claim 1 after curing.
11. The 3D printed electrode of claim 10, where the plurality of cured ink strands are arranged in a face-centered tetragonal geometry.
12. The 3D printed electrode of claim 10, where the plurality of cured ink strands are arranged in a cubic geometry.
13. The 3D printed electrode of claim 10, wherein the ink composition after curing has a surface area of 50 $m^2$/g to 1,600 $m^2$/g.
14. A fuel cell comprising the 3D printed electrode of claim 10.
15. The fuel cell of claim 14, wherein the 3D printed electrode is a cathode that is electrochemically active for an oxygen reduction reaction (ORR).
16. A method of preparing a printed electrode, the method comprising:
    mixing the powdered precursor and the polymer matrix to form the ink composition of claim 1;
    3D printing a plurality of ink strands from the ink composition on a substrate; and
    curing the plurality of ink strands to form the printed electrode.
17. The method of claim 16, further comprising pyrolyzing the printed electrode at a temperature of 500° C. to 900° C.
18. The method of claim 16, wherein the mixing the powdered precursor and the polymer matrix further comprises mixing with a pore-forming material selected from a salt, a sugar, urea, a urea derivative, and combinations thereof.
19. The method of claim 18, further comprising removing the pore-forming material from the printed electrode after curing.
20. The method of claim 19, wherein the removing the pore-forming material from the printed electrode comprises dissolving the pore-forming material in water.

* * * * *